US008849689B1

(12) United States Patent
Jagannathan et al.

(10) Patent No.: US 8,849,689 B1
(45) Date of Patent: Sep. 30, 2014

(54) METHOD AND SYSTEM FOR PROVIDING DYNAMIC APPOINTMENT SCHEDULING AND TRACKING

(75) Inventors: Sridhar Jagannathan, Los Altos, CA (US); Stoyan P. Kenderov, San Francisco, CA (US); Eran Arbel, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 180 days.

(21) Appl. No.: 13/356,102

(22) Filed: Jan. 23, 2012

(51) Int. Cl.
*G06Q 10/00* (2012.01)
*G06Q 10/10* (2012.01)
*G06Q 10/06* (2012.01)

(52) U.S. Cl.
CPC .... *G06Q 10/1095* (2013.01); *G06Q 10/063116* (2013.01)
USPC ....... 705/7.19; 705/7.12; 705/7.13; 705/7.16; 705/7.18; 705/7.24

(58) Field of Classification Search
CPC ............ G06Q 10/109; G06Q 10/1095; G06Q 10/1093; G06Q 10/063116; G06Q 10/06314
USPC ................................. 705/7.11–7.42
See application file for complete search history.

(56) References Cited

U.S. PATENT DOCUMENTS

| | | | | |
|---|---|---|---|---|
| 6,101,480 | A * | 8/2000 | Conmy et al. | 705/7.18 |
| 6,865,538 | B2 * | 3/2005 | Chithambaram et al. | 705/1.1 |
| 7,027,995 | B2 * | 4/2006 | Kaufman et al. | 705/7.12 |
| 7,188,073 | B1 * | 3/2007 | Tam et al. | 705/7.16 |
| 7,283,970 | B2 * | 10/2007 | Cragun et al. | 705/7.19 |
| 7,869,941 | B2 * | 1/2011 | Coughlin et al. | 701/533 |
| 8,065,175 | B1 * | 11/2011 | Lewis | 705/7.19 |
| 8,150,718 | B2 * | 4/2012 | Olliphant | 705/7.19 |
| 2002/0191035 | A1 * | 12/2002 | Selent | 345/866 |
| 2003/0149606 | A1 * | 8/2003 | Cragun et al. | 705/8 |
| 2003/0204474 | A1 * | 10/2003 | Capek et al. | 705/64 |
| 2005/0027580 | A1 * | 2/2005 | Crici et al. | 705/8 |
| 2005/0038690 | A1 * | 2/2005 | Hayes-Roth | 705/9 |
| 2006/0046898 | A1 * | 3/2006 | Harvey | 482/8 |
| 2007/0083410 | A1 * | 4/2007 | Hanna | 705/8 |
| 2007/0106548 | A1 * | 5/2007 | Bratt | 705/9 |

(Continued)

OTHER PUBLICATIONS

Murthy, Uday S; Smith, L Murphy, "Electronic meeting systems at work," CPA Journal, v65n12, pp. 26-29, Dec. 1995. http://www.nysscpa.org/cpajournal/1995/dec95/f261295.htm.*

(Continued)

*Primary Examiner* — Justin M Pats
*Assistant Examiner* — Richard Scheunemann
(74) *Attorney, Agent, or Firm* — Hawley Troxell Ennis & Hawley LLP; Philip McKay

(57) ABSTRACT

An appointment tracking and dynamic modification system is provided that is associated with an appointment scheduling application. A registered attending client/customer is assigned an appointment with a service provider and appointment data associated with the assigned appointment, including data indicating the location of the appointment and the time of the appointment, is obtained. The physical location and/or status of the registered attending client/customer, and/or service provider, is then monitored to calculate an estimated arrival time, and/or availability, of the registered attending client/customer, and/or service provider, at the appointment time and location. If a determination is made that the registered attending client/customer, and/or service provider, is likely to be delayed, or unavailable, at the scheduled time of the appointment, one or more actions are automatically taken to notify the registered attending client/customer, and/or service provider, and/or to reschedule, or otherwise modify, the scheduled appointment in accordance with appointment modification rules.

22 Claims, 2 Drawing Sheets

(56) References Cited

U.S. PATENT DOCUMENTS

| | | | |
|---|---|---|---|
| 2007/0118415 A1* | 5/2007 | Chen et al. | 705/8 |
| 2007/0282661 A1* | 12/2007 | Franco | 705/9 |
| 2008/0033778 A1* | 2/2008 | Boss et al. | 705/9 |
| 2008/0071599 A1* | 3/2008 | Muguda | 705/9 |
| 2008/0147469 A1* | 6/2008 | Murillo et al. | 705/9 |
| 2008/0167938 A1* | 7/2008 | Meisels et al. | 705/9 |
| 2008/0195312 A1* | 8/2008 | Aaron et al. | 701/209 |
| 2009/0089133 A1* | 4/2009 | Johnson et al. | 705/9 |
| 2010/0017222 A1* | 1/2010 | Yeluri et al. | 705/2 |
| 2010/0082247 A1* | 4/2010 | Klein et al. | 701/209 |
| 2010/0094678 A1* | 4/2010 | Gupta et al. | 705/9 |
| 2010/0198646 A1* | 8/2010 | Mikan et al. | 705/9 |
| 2011/0015963 A1* | 1/2011 | Chafle et al. | 705/9 |
| 2011/0071864 A1* | 3/2011 | Hourdou et al. | 705/6 |
| 2011/0072372 A1* | 3/2011 | Fritzley et al. | 715/764 |
| 2011/0231216 A1* | 9/2011 | Fyke et al. | 705/7.12 |
| 2012/0096092 A1* | 4/2012 | Davidge et al. | 709/206 |
| 2012/0253545 A1* | 10/2012 | Tachibana et al. | 700/306 |

OTHER PUBLICATIONS

Jagannathan et al., "Method and System for Meeting Tracking and Dynamic Modification," U.S. Appl. No. 13/285,399, filed Oct. 31, 2011.

\* cited by examiner

METHOD AND SYSTEM FOR PROVIDING DYNAMIC APPOINTMENT SCHEDULING AND TRACKING

BACKGROUND

For many service-based businesses, the key to maximizing efficiency, and income, is to maximize the number of client appointments scheduled and completed each day. As a specific example, healthcare service providers typically desire to maximize the number of patient appointments to be scheduled and completed each business day. However, this same situation applies to numerous other service providers such a law offices, hair salons, etc. As a result, most service-based businesses now rely on computing system implemented appointment scheduling systems that track client appointments scheduled with the service provider and help schedule an optimum number of client appointments for any given business day well in advance. These appointment scheduling systems also help ensure that issues such as overbooking of client appointments do not occur, thereby increasing client satisfaction while at the same time maximizing the number of client appointments that are scheduled.

Due, in large part, to the use of calendar applications, appointment scheduling applications and systems, and the wide spread adoption of various computing systems and mobile computing systems, the scheduling of appointments is now more efficient and accurate than ever before. However, one side effect of the efficiency of modern appointment scheduling systems and calendars is that these systems allow for appointment scheduling that is often more accurate, precise, and reliable than either the clients/customers being scheduled for the appointment and/or the service providers. Consequently, in many cases, appointments are scheduled so efficiently that the resulting appointment schedules do not provide enough margin of error, or buffer space, to take into account the realities of modern life that prevent many appointments from taking place at the scheduled time and/or in the allotted time. However, delays due to preceding appointments running longer than expected, traffic, emergencies, or any one or more of the multitude of other issues that daily cause one or more parties to a scheduled appointment to be running late are indeed a reality and are very common.

As a result, using currently available appointment scheduling systems, it often happens that when one or more parties to an appointment are late, the appointment scheduling system is thrown off as other scheduled appointments are shifted to later times by the ripple effect created by the single late event. This ripple effect often extends well beyond the single late appointment, and/or the parties to the late appointment, as all other scheduled calendar events and appointment times for that day are, for all practical purposes, shifted to a later time.

As a specific example, when a client, such as a patient, shows up 20 minutes late for a service provider appointment, such as a doctor's appointment, the service provider is currently forced to either cancel the appointment, in which case the service provider's "billable" time is lost, and income is lost, or accept/wait for the late client and thereby force every other client scheduled to see that service provider later that day to be essentially shifted to an appointment time that is 20 minutes later. To make matters worse, the cumulative effect of several of these incidents often results in very long client wait times, and ultimately, a less than ideal client experience. In addition, in some cases it is the service provider who is running late due to not only late appointments, but also appointments that run longer than expected, or emergencies, or for any other reason, and the service provider may be the party who is unavailable at the scheduled appointment time.

Using currently available appointment scheduling systems, parties scheduled for a given appointment have no indication that another party is running late for the scheduled appointment unless the late party takes one or more proactive actions to inform the other party to the appointment that they will be late. However, since the late party is running late, and therefore is, by definition, under time pressure and/or is engaged in another activity, it is often the case that the late party does not, or cannot, take the action necessary to inform the other party to the appointment that they are running late.

In addition, even in cases when the late party does inform the other party to the appointment that they are running late, the late party often fails to inform the other party that they are running late in time to take corrective action, such as filling in the time slot with another client/customer appointment.

In addition, even in cases when the late party does inform the other party to the appointment that they are running late, the late party often does not have any way to reasonably estimate when they will arrive. As an example, when traffic is causing the delay, it often happens that the late party cannot accurately estimate the remaining travel time.

The result of the situation described above is the introduction of inefficiencies, stress, lost income, and wasted time. In addition, these negative results are often imposed not only on the parties to a given appointment, but also numerous other "innocent" parties scheduled for other appointments. Consequently, even though currently available appointment scheduling systems theoretically allow highly efficient appointment scheduling, the benefits of these systems can become liabilities when the realities of everyday life are introduced in the form of delayed parties to the scheduled appointments, and the current lack of an effective system for identifying and providing timely notification that a party is likely to be delayed for a scheduled appointment.

SUMMARY

In accordance with one embodiment, a system and method for providing dynamic appointment scheduling and tracking includes a process for providing dynamic appointment scheduling and tracking whereby an appointment tracking and dynamic modification system is provided. In one embodiment, the appointment tracking and dynamic modification system is associated with one or more appointment scheduling applications implemented on one or more computing systems, as used by one or more service providers.

In one embodiment, one or more clients/customers are registered to use, and/or take part in, the process for providing dynamic appointment scheduling and tracking.

In one embodiment, a client/customer registered with the process for providing dynamic appointment scheduling and tracking is assigned an appointment date and time through the one or more appointment scheduling applications associated with the process for providing dynamic appointment scheduling and tracking. In one embodiment, appointment data associated with the assigned appointment, including data indicating the location of the appointment, and the time of the appointment, is provided to the process for providing dynamic appointment scheduling and tracking, and/or the appointment tracking and dynamic modification system.

In one embodiment, the physical location and/or status of the registered attending client/customer is then monitored to calculate an estimated arrival time of the registered attending client/customer at the appointment location and to determine if the registered attending client/customer may be delayed with respect to the scheduled appointment.

In one embodiment, the physical location and/or status of the service provider associated with the scheduled appointment is also monitored to determine if the service provider will be available at the calculated estimated arrival time of the registered attending client/customer at the appointment location and to determine if the service provider may be delayed with respect to the scheduled appointment.

In one embodiment, if a determination is made that the registered attending client/customer is likely to be delayed, or unavailable, at the scheduled time of the appointment, or the service provider is likely to be delayed, or unavailable, at the scheduled time of the appointment, or the calculated arrival time of the registered attending client/customer, one or more actions are taken to notify the registered attending client/customer, and/or to reschedule, or otherwise modify, the scheduled appointment in accordance with appointment modification rules associated with the operation and/or application of the process for providing dynamic appointment scheduling and tracking, and/or the appointment data from one or more appointment scheduling applications, and/or the registered attending client/customer registration data.

Using the system and method for providing dynamic appointment scheduling and tracking, as discussed herein, the physical location and/or status of the registered attending client/customer, and/or the availability of a service provider, associated with a scheduled appointment is monitored and if the either the registered attending client/customer, or the service provider, may be delayed with respect to the scheduled appointment, the registered attending client/customer, or the service provider, are automatically notified as early as possible so that the other party is running late. In addition, one or more actions to mitigate the effect of the delayed appointment on either party, are automatically taken based on predefined appointment modification rules.

Consequently, the system and method for providing dynamic appointment scheduling and tracking, as discussed herein, provides an effective system for identifying potentially delayed parties to an appointment, providing timely notification to the other party to the appointment of the delayed party, and/or the delayed party's estimated arrival time/availability, and providing solutions to the situation, so that inefficiencies, stress, lost productivity, and wasted time is minimized. As a result, using the system and method for providing dynamic appointment scheduling and tracking discussed herein, the benefits of appointment scheduling applications can be realized even in the face of the realities of modern life.

Figure 1:
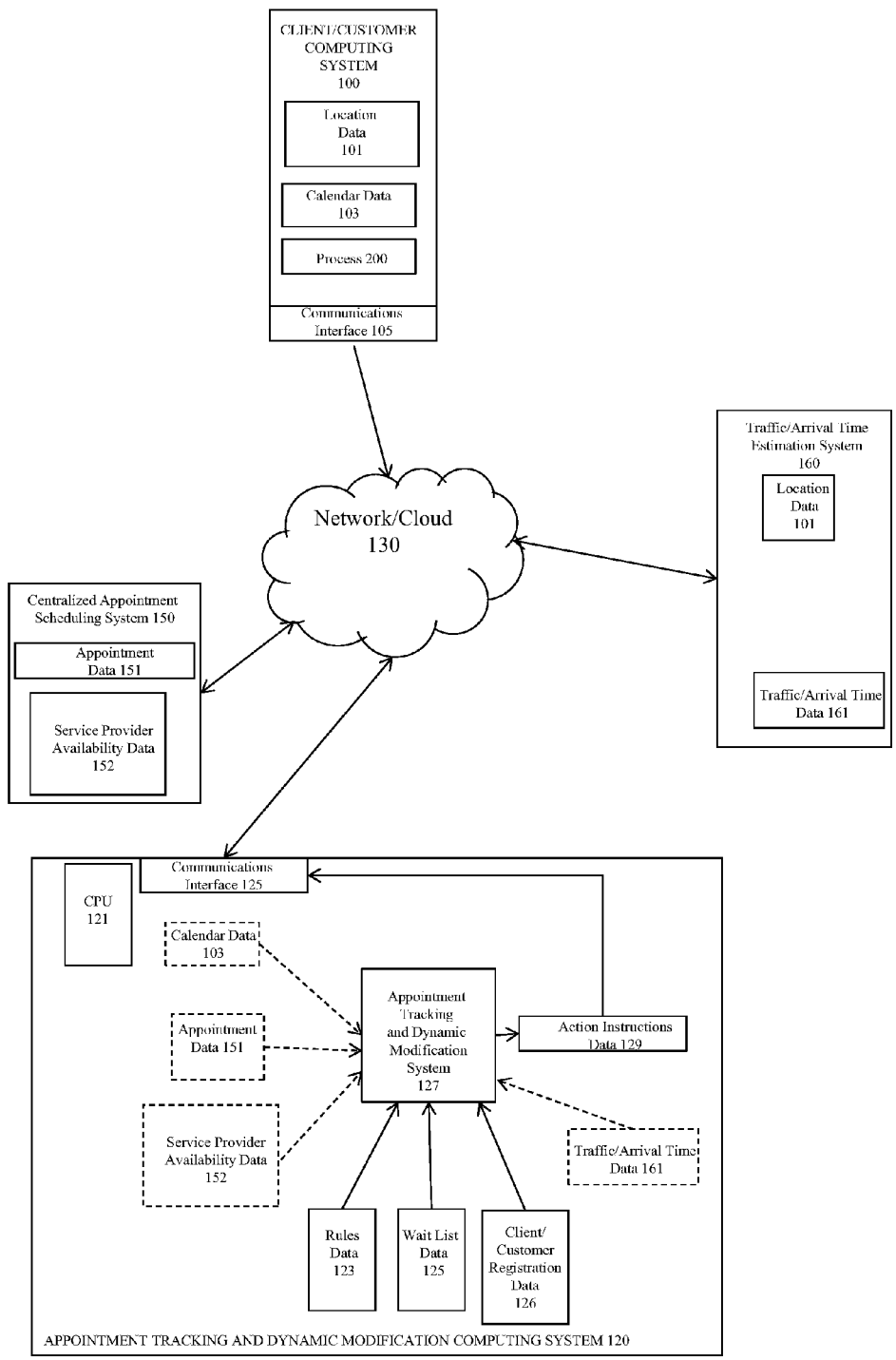
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing dynamic appointment scheduling and tracking includes a process for providing dynamic appointment scheduling and tracking.

In one embodiment, at least part of the process for providing dynamic appointment scheduling and tracking is implemented on one or more computing systems, and/or one or more mobile computing systems.

Herein the term "computing system" includes, but is not limited to, any computing system known in the art at the time of filing, and/or as developed after the time of filing, such as, but not limited to: a desktop computing system; a laptop computing system; a notebook computing system; a workstation; a two-way pager; a cellular telephone; a smart phone; a digital wireless telephone; a Personal Digital Assistant (PDA); a server computer; an Internet appliance, and/or any other device, or any desired combination of these devices, that includes components that can execute all, or part, of a process for providing dynamic appointment scheduling and tracking in accordance with at least one of the embodiments as discussed herein, and/or as known in the art at the time of filing, and/or as developed after the time of filing.

Herein, the term "mobile computing system" includes, but not limited to: a mobile phone; a smart phone; an internet appliance; any SMS capable system; or any other mobile computing system as discussed herein, and/or as known in the art at the time of filing, and/or as developed after the time of filing.

In one embodiment, at least part of the process for providing dynamic appointment scheduling and tracking is, or is associated with, one or more applications, and/or data management systems, implemented on one or more computing systems accessible by one or more parties.

Herein, the term "application" includes, but is not limited to, any computing system implemented, and/or online, systems, packages, programs, and/or modules, implemented in whole, or in part, by any computing system and/or website as discussed herein, and/or as known in the art/available at the time of filing, and/or as developed/made available after the time of filing. Specific examples of applications include, but are not limited to, calendar applications, appointment scheduling applications, mobile applications, social media applications, data management systems, operating systems, interface systems, and/or financial management systems.

In one embodiment, an appointment tracking and dynamic modification system is provided.

In one embodiment, the appointment tracking and dynamic modification system provided is implemented, at least in part, on one or more appointment tracking and dynamic modification computing systems, and/or one or more user computing systems, and/or one or more mobile computing systems.

In one embodiment, the appointment tracking and dynamic modification system provided is, or is associated with, one or more applications and/or data management systems implemented on one or more appointment tracking and dynamic modification computing systems, and/or one or more mobile computing systems, accessible by one or more parties to a scheduled appointment.

In one embodiment, the appointment tracking and dynamic modification system is associated with one or more appointment scheduling applications implemented on one or more service provider computing systems as discussed herein, and/or as known in the art/available at the time of filing, and/or as developed/made available after the time of filing.

In one embodiment, the appointment tracking and dynamic modification system is associated with one or more centralized appointment scheduling applications used by/accessed by one or more users such as employees of a service/appointment-based business providing the centralized appointment scheduling applications, or any other users of a centralized appointment scheduling application as discussed herein, and/or as known in the art/available at the time of filing, and/or as developed/made available after the time of filing.

In one embodiment, the appointment tracking and dynamic modification system is part of a cloud-based architecture, and/or system, whereby the appointment tracking and dynamic modification system can be accessed by, and/or can access, multiple computing systems, and/or mobile computing systems, multiple individual user calendar and/or appointment scheduling applications, and/or multiple centralized appointment scheduling applications, as discussed herein, and/or as known in the art/available at the time of filing, and/or as developed/made available after the time of filing.

In one embodiment, as discussed in more detail below, the appointment tracking and dynamic modification system includes, and/or is linked to, and/or is associated with, one or more location monitoring systems as discussed herein, and/or as known in the art/available at the time of filing, and/or as developed/made available after the time of filing, through which the appointment tracking and dynamic modification system obtains location tracking data associated with one or more computing systems, and/or mobile computing systems, used by, under the control of, and/or otherwise associated with, one or more clients/customers and/or service providers.

In one embodiment, as discussed in more detail below, the appointment tracking and dynamic modification system includes, and/or is linked to, and/or is associated with, one or more traffic analysis and/or arrival time estimators, as discussed herein, and/or as known in the art/available at the time of filing, and/or as developed/made available after the time of filing, whereby the appointment tracking and dynamic modification system obtains data indicating an estimated time of arrival for the registered attending client/customer, and/or service providers, who are scheduled for an appointment.

In one embodiment, as discussed in more detail below, the appointment tracking and dynamic modification system includes, and/or is linked to, and/or is associated with, one or more calendar/appointment scheduling systems, as discussed herein, and/or as known in the art/available at the time of filing, and/or as developed/made available after the time of filing, whereby the appointment tracking and dynamic modification system obtains data indicating the estimated availability of a service provider at the time of the scheduled appointment and/or the estimated time of arrival of the registered attending client/customer scheduled for an appointment.

In one embodiment, appointment modification rules data associated with the operation and/or application of the appointment tracking and dynamic modification system are obtained and/or defined. In various embodiments, the appointment modification rules data represent instructions and guidelines that govern the operation and/or application of various actions to be initiated by the appointment tracking and dynamic modification system.

In various embodiments, the appointment modification rules data includes instructions and guidelines that govern the operation and/or application of various actions to be initiated by the appointment tracking and dynamic modification system that are provided by input from one or more service providers and/or clients/customers using, and or implementing, the process for providing dynamic appointment scheduling and tracking.

In various embodiments, the appointment modification rules data includes instructions and guidelines that govern the operation and/or application of various actions to be initiated by the appointment tracking and dynamic modification system that are provided by the provider of the process for providing dynamic appointment scheduling and tracking.

As a specific example, in one embodiment, appointment modification rules data includes instructions and or guidelines including, but not limited to: data representing a waitlist of substitute clients/customers for vacated scheduled appointments; data indicating a threshold estimated delay time after which the scheduled appointment will be canceled/vacated, or will be filled by clients/customers on a waitlist; data designating one or more critical parties, such as a preferred or specific service provider, that must be present in order for an appointment to proceed; data indicating various service provider policies such as not canceling or rescheduling defined clients/customers, or sending any clients/customers away, or giving regular, or highly profitable clients/customers priority; data indicating various service provider policies such as giving emergency situations higher priority and longer delay windows before the appointment is rescheduled; and/or any other parameters desired by one or more parties to a scheduled appointment and/or the provider of the appointment tracking and dynamic modification system.

In various other embodiments, appointment modification rules data can include data representing any instructions and or operating parameters desired, and/or required, by any of the parties using, and/or implementing, the process for providing dynamic appointment scheduling and tracking.

In one embodiment, the process for providing dynamic appointment scheduling and tracking, and/or the appointment tracking and dynamic modification system, is provided access to appointment data from one or more appointment scheduling applications, associated with one or more service/appointment-based businesses using, and/or implementing, the process for providing dynamic appointment scheduling and tracking.

In one embodiment, the process for providing dynamic appointment scheduling and tracking, and/or the appointment tracking and dynamic modification system, is provided access to appointment data from one or more appointment scheduling applications, that is a parent application for, or an application associated with, the process for providing dynamic appointment scheduling and tracking, and/or the appointment tracking and dynamic modification system.

In various embodiments, the appointment data provided to, and/or accessed by, the process for providing dynamic appointment scheduling and tracking, and/or the appointment tracking and dynamic modification system includes, but is not limited to, one or more of: data indicating the scheduled time for the appointment; data indicating the location of the scheduled appointment; data indicating the estimated length of time for the scheduled appointment; data indicating the service providers scheduled to attend the appointment; data indicating appointments scheduled before and/or after the scheduled appointment for the service provider scheduled to attend the appointment; data indicating any blocks of time available for the service providers scheduled to attend the appointment; and/or any other data associated with the scheduled appointment, and/or other scheduled appointments, through the one or more appointment scheduling systems associated with the process for providing dynamic appointment scheduling and tracking, and/or the appointment tracking and dynamic modification system, as discussed herein, and/or as known in the art/available at the time of filing, and/or as developed/made available after the time of filing.

In one embodiment, one or more clients/customers are registered to use, and/or take part in, the process for providing dynamic appointment scheduling and tracking. In one embodiment, as part of the registration process, the clients/customers are requested to provide client/customer registration data.

In various embodiments, the client/customer registration data includes, but is not limited to, one or more of: contact information for the client/customer such as mobile phone numbers, e-mail addresses, and/or other text-based message contact information, and/or traditional phone numbers, etc.; data indicating various preferences associated with the client/customer such as, occupations and flexibility with regard to scheduling, the need or desire to meet with a specific service provider, etc.; the service to be provided at the appointment; permission to access one or more calendar systems and/or appointment scheduling systems associated with the client/customer; permission to track the location of the client/customer; and/or any other registration data desired, and/or required, by the service/appointment-based business using, and/or implementing, the process for providing dynamic appointment scheduling and tracking, as discussed herein, and/or as known in the art/available at the time of filing, and/or as developed/made available after the time of filing.

In one embodiment, an appointment is assigned to the client/customer using the one or more appointment scheduling applications associated with the process for providing dynamic appointment scheduling and tracking. In one embodiment, appointment data associated with the assigned appointment is then provided to the process for providing dynamic appointment scheduling and tracking, and/or the appointment tracking and dynamic modification system, as discussed above.

In one embodiment, the location and/or status of the registered attending client/customer, and/or service provider, for the scheduled appointment is monitored.

In one embodiment, beginning at a defined monitoring commencement time prior to the time of the scheduled appointment, the location and/or status of the registered attending client/customer, and/or service provider, for the scheduled appointment is monitored.

In various embodiments, the monitoring commencement time is defined/established by the provider of the process for providing dynamic appointment scheduling and tracking, and/or the appointment tracking and dynamic modification system. In other embodiments, the monitoring commencement time is defined/established by the registered attending client/customer.

In one embodiment, the location and/or status of the registered attending client/customer, and/or service provider, is determined, at least in part, based on the positions of one or more mobile devices and/or mobile computing systems associated with the registered attending client/customer, and/or service provider.

As noted above, in one embodiment, the appointment tracking and dynamic modification system of the process for providing dynamic appointment scheduling and tracking includes, and/or is linked to, and/or is associated with, one or more location monitoring systems as discussed herein, and/or as known in the art/available at the time of filing, and/or as developed/made available after the time of filing.

In various embodiments, through the one or more location monitoring systems, the positions of one or more mobile devices and/or mobile computing systems associated with the registered attending client/customer, and/or service provider, and therefore presumably the registered attending client/customer, and/or service provider, are monitored/tracked based on analysis of a communication signal emitted by the mobile devices and/or mobile computing systems, and/or the relay stations used by the mobile devices and/or mobile computing systems. In various embodiments, the position of the one or more mobile devices and/or mobile computing systems is determined using a Global Positioning Satellite (GPS) system and/or a GPS capability provided with the one or more mobile devices and/or mobile computing systems. In various embodiments, the position of the one or more mobile devices and/or mobile computing systems is provided by the one or more mobile devices themselves via one or more data links. In various embodiments, the position of the one or more mobile devices and/or mobile computing systems is determined and/or provided by any method, means, mechanism, or procedure for determining a position of a mobile device as discussed herein, and/or as known in the art at the time of filing, and/or as developed after the time of filing.

In some embodiments, the location and/or status of the registered attending client/customer, and/or service provider, is determined, at least in part, based on data provided directly from the registered attending client/customer, and/or service provider, and/or from one or more calendar systems and/or appointment scheduling systems, associated with the registered attending client/customer, and/or service provider.

In one embodiment, the location and/or status of the registered attending client/customer, and/or the service provider, is monitored to determine if the registered attending client/customer, and/or service provider, may be delayed with respect to the scheduled appointment.

As noted above, in one embodiment, the appointment tracking and dynamic modification system of the process for providing dynamic appointment scheduling and tracking, includes, and/or is linked to, and/or is associated with, one or more traffic analysis and/or arrival time estimators, as discussed herein, and/or as known in the art/available at the time of filing, and/or as developed/made available after the time of filing.

In one embodiment, the one or more traffic analysis and/or arrival time estimators are provided the location data for the registered attending client/customer, and/or service provider, from the one or more location monitoring systems along with location data indicating the appointment location and appointment time data from the scheduled appointment data. In one embodiment, the one or more traffic analysis and/or arrival time estimators then determines an estimated arrival time for the registered attending client/customer, and/or service provider, at the scheduled appointment place.

In various embodiments, the one or more traffic analysis and/or arrival time estimators determine the estimated arrival times for the registered attending client/customer, and/or service provider, by determining the average commute time between the current location of the registered attending client/customer, and/or service provider, and the location of the scheduled appointment. In some embodiments, the average commute time is determined for the scheduled time of the appointment, i.e., based on average traffic and/or other commute time data associated with the specific appointment time.

In various embodiments the one or more traffic analysis and/or arrival time estimators determine the estimated arrival times for the registered attending client/customer, and/or service provider, using relative real time data indicating the traffic, and/or actual delay times, between the current location of the registered attending client/customer, and/or service provider, and the location of the scheduled appointment. In these embodiments, the one or more traffic analysis and or arrival time estimators are provided input from one or more real time traffic monitoring and commute time estimation systems, as discussed herein, and/or as known in the art/ available at the time of filing, and/or as developed/made available after the time of filing.

In various embodiments, the one or more traffic analysis and or arrival time estimators determine the estimated time of arrival of the registered attending client/customer, and/or service provider, by calculating a relative real time speed and direction associated with the mobile devices, and/or mobile computing systems, associated with the registered attending client/customer, and/or service provider.

For instance, in one embodiment, the data regarding the position of the one or more mobile devices, and/or mobile computing systems, associated with a registered attending client/customer, and/or service provider, is obtained at two or more times and then this data is used to calculate, and/or update, an estimated direction/path and speed of the registered attending client/customer, and/or service provider.

In one embodiment, the data regarding the position of the one or more mobile devices, and/or mobile computing systems, at two or more times is used to calculate, and/or update, an estimated direction/path and speed of the registered attending client/customer, and/or service provider, and then the estimated direction/path for the registered attending client/customer, and/or service provider, is modified based on other data particular to the registered attending client/customer, and/or service provider, such as data obtained from a calendar application, in one embodiment as implemented on the mobile device, indicating a time and place of any other appointments/appointments for the registered attending client/customer, and/or service provider, that must occur before the scheduled appointment.

Numerous means, methods, equations, algorithms, procedures and processes are known in the art for calculating an estimated direction/path and speed using two or more positions taken at different times. Consequently, a more detailed discussion of any particular means, methods, equations, algorithms, procedures and processes for calculating an estimated direction/path and speed of a registered attending client/customer using two or more positions taken at different times is omitted here to avoid detracting from the invention.

As noted above, in one embodiment, the appointment tracking and dynamic modification system of the process for providing dynamic appointment scheduling and tracking, includes, and/or is linked to, and/or is associated with, one or more systems, methods, and/or mechanisms, for determining the availability of a service provider at the time of the scheduled appointment, or at the estimated arrival time of the attending client/customer.

As one illustrative example, in one embodiment, the availability of a service provider is determined implicitly based on tracking when other earlier appointments with the service provider end and/or when another earlier registered attending client/customer drives away from the service provider's location.

As another illustrative example, in one embodiment, the availability of a service provider is determined implicitly based a trigger event such as an earlier client/customer going to a front desk/station to setup a follow-up appointment.

As another illustrative example, in one embodiment, the availability of a service provider is determined explicitly via staff updates when a given earlier appointment begins or ends.

In one embodiment, if a determination is made that the registered attending client/customer, and/or service provider, is likely to be delayed, or unavailable, at the scheduled time of the appointment, one or more actions are taken to notify the service provider, or registered attending client/customer, and/ or to reschedule, or otherwise modify, the scheduled appointment in accordance with the appointment modification rules data associated with the operation and/or application of the process for providing dynamic appointment scheduling and tracking, and/or the appointment data from one or more appointment scheduling applications, and/or the client/customer registration data. The delayed party, i.e., the registered attending client/customer, and/or service provider, is then notified of any change.

In one embodiment, once a determination is made that the registered attending client/customer, and/or service provider, is likely to be delayed, and/or unavailable, at the scheduled time of the appointment, the one or more actions taken include, but are not limited to, analyzing the appointment modification rules data, and the appointment data from one or more appointment scheduling applications, to determine if the estimated delay can be absorbed. If the estimated delay time can be absorbed, then the appointment is automatically rescheduled for the estimated arrival/availability time of the delayed party and the delayed party is informed of the change.

In one embodiment, once a determination is made that the registered attending client/customer, and/or service provider, is likely to be delayed, and/or unavailable, at the scheduled time of the appointment, the one or more actions taken include, but are not limited to, analyzing the appointment modification rules data, and the appointment data from one or more appointment scheduling applications, and determining if the delayed party can be substituted with a wait-listed client/customer or a stand-in service provider or an appointment exchange can be made.

In one embodiment, once a determination is made that the registered attending client/customer, and/or service provider, is likely to be delayed, and/or unavailable, at the scheduled time of the appointment, the one or more actions taken include the process for providing dynamic appointment scheduling and tracking, and/or the appointment tracking and dynamic modification system, establishing voice based communication, such as a phone call, with the delayed party and providing the registered attending client/customer the capability to suggest, and/or to agree on, modifications to the scheduled appointment via the voice communications. In one embodiment, the voice communication between the registered attending client/customer is monitored by the process for providing dynamic appointment scheduling and tracking, and/or the appointment tracking and dynamic modification system, and the agreement of the registered attending client/ customer modifying the scheduled appointment is obtained, and/or implemented, by the process for providing dynamic appointment scheduling and tracking, and/or the appointment tracking and dynamic modification system.

In one embodiment, once a determination is made that the registered attending client/customer, and/or service provider, is likely to be delayed, and/or unavailable, at the scheduled time of the appointment, the one or more actions taken include the process for providing dynamic appointment scheduling and tracking, and/or the appointment tracking and dynamic modification system, establishing chat based communication and/or social media based communication, such Yammer™ Facebook™, Yahoo™, Messenger™, Skype™, Twitter™ etc., with the registered attending client/customer to the scheduled appointment, and providing the registered attending client/customer the capability to suggest, and/or to agree on, modifications to the scheduled appointment via the chat based communication and/or social media based communication. In one embodiment, the communication between the registered attending client/customer is monitored by the process for providing dynamic appointment scheduling and tracking, and/or the appointment tracking and dynamic modification system, and the agreement of the registered attending client/customer modifying the scheduled appointment is obtained, and/or implemented, by the process for providing dynamic appointment scheduling and tracking, and/or the appointment tracking and dynamic modification system.

In one embodiment, once a determination is made that the registered attending client/customer, and/or the service provider, is likely to be delayed, and/or unavailable, at the scheduled time of the appointment, the one or more actions taken include, notifying the other party, and any combination of the above actions, or other actions, consistent with the appointment modification rules data associated with the operation and/or application of the process for providing dynamic appointment scheduling and tracking, and/or the appointment tracking and dynamic modification system, and/or the appointment data from one or more appointment scheduling applications, and/or the client/customer registration data provided to the process for providing dynamic appointment scheduling and tracking, as discussed herein, and/or as known in the art/available at the time of filing, and/or as developed/made available after the time of filing.

Hardware System Architecture

FIG. 1 is a block diagram of an exemplary hardware architecture for implementing one embodiment of a system and method for providing dynamic appointment scheduling and tracking, such as exemplary process 200 (FIG. 2) discussed herein, that, returning to FIG. 1, includes: client/customer computing system 100, in one embodiment including calendar data 103 and location data 101; appointment tracking and dynamic modification computing system 120; centralized appointment scheduling system 150; and traffic/arrival time estimation system 160; all operatively coupled by a network/cloud 130.

In one embodiment, at least part of process for providing dynamic appointment scheduling and tracking 200, shown as process 200 in FIG. 1, is implemented on one or more computing systems, and/or one or more mobile computing systems, such as client/customer computing system 100, and/or appointment tracking and dynamic modification computing system 120, and/or centralized appointment scheduling system 150.

Herein the term "computing system" includes, but is not limited to, any computing system known in the art at the time of filing, and/or as developed after the time of filing, such as, but not limited to: a desktop computing system; a laptop computing system; a notebook computing system; a workstation; a two-way pager; a cellular telephone; a smart phone; a digital wireless telephone; a Personal Digital Assistant (PDA); a server computer; an Internet appliance, and/or any other device, or any desired combination of these devices, that includes components that can execute all, or part, of a process for providing dynamic appointment scheduling and tracking in accordance with at least one of the embodiments as discussed herein, and/or as known in the art at the time of filing, and/or as developed after the time of filing.

Herein, the term "mobile computing system" includes, but not limited to: a mobile phone; a smart phone; an internet appliance; any SMS capable system; or any other mobile computing system as discussed herein, and/or as known in the art at the time of filing, and/or as developed after the time of filing.

As seen in FIG. 1, client/customer computing system 100 includes all, or part of, process for providing dynamic appointment scheduling and tracking 200, shown as process 200 in FIG. 1.

As seen in FIG. 1, client/customer computing system 100 typically includes: a central processing unit (CPU) (not shown in FIG. 1); location data 101; optional calendar data 103; process 200; and communications interface 105, for connecting client/customer computing system 100 to network/cloud 130.

In one embodiment, client/customer computing system 100 optionally includes all, or part, of a computing system implemented calendar system (not shown in FIG. 1) that generates optional calendar data 103.

In one embodiment, appointment tracking and dynamic modification system 200 is associated with one or more appointment scheduling applications implemented on one or more appointment scheduling systems, such as centralized appointment scheduling system 150, and/or as known in the art/available at the time of filing, and/or as developed/made available after the time of filing.

In one embodiment, process for providing dynamic appointment scheduling and tracking 200, and the appointment tracking and dynamic modification system 127, is associated with centralized appointment scheduling system 150. In various embodiments, centralized appointment scheduling system 150 is used by/accessed by one or more users such as employees of a service/appointment-based business providing the centralized appointment scheduling applications, or any other users of a centralized appointment scheduling application as discussed herein, and/or as known in the art/available at the time of filing, and/or as developed/made available after the time of filing. In various embodiments, centralized appointment scheduling system 150 is used by/accessed by one or more users through network/cloud 130.

In one embodiment, process for providing dynamic appointment scheduling and tracking 200, and/or appointment tracking and dynamic modification system 127, is provided access to appointment data 151 from one or more appointment scheduling applications, that is a parent application for, or an application associated with, process for providing dynamic appointment scheduling and tracking 200, and/or appointment tracking and dynamic modification system 127.

In various embodiments, appointment data 151 is provided to, and/or accessed by, process for providing dynamic appointment scheduling and tracking 200, and/or the appointment tracking and dynamic modification system 127, by the one or more appointment scheduling applications. In various embodiments, appointment data 151 includes, but is not limited to, one or more of: data indicating the scheduled time for the appointment; data indicating the location of the scheduled appointment; data indicating the estimated length of time for the scheduled appointment; data indicating the service provider scheduled to attend the appointment; data indicating appointments scheduled before and/or after the scheduled appointment; data indicating any blocks of time available; and/or any other data associated with the scheduled appointment, and/or other scheduled appointments, made through the one or more appointment scheduling systems associated with process for providing dynamic appointment scheduling and tracking 200, and/or appointment tracking and dynamic modification system 127, as discussed herein, and/or as known in the art/available at the time of filing, and/or as developed/made available after the time of filing.

As also shown in FIG. 1, in one embodiment, client/customer computing system 100 includes location data 101 indicating a location of client/customer computing system 100, and presumably the client/customer.

In one embodiment, location data 101 is obtained, at least in part, from a communication signal emitted by client/customer computing system 100 and/or the relay stations used by client/customer computing system 100. In various embodiments, the position of client/customer computing system 100 is determined, and location data 101 is provided/generated, using a Global Positioning Satellite (GPS) system and/or a GPS capability provided with client/customer computing system 100 (not shown in FIG. 1). In various embodiments, the position of client/customer computing system 100 is determined, and location data 101 is provided/generated, by the client/customer computing system 100 itself via one or more data links. In various embodiments, the position of client/customer computing system 100 is determined, and location data 101 is provided/generated, by any method, means, mechanism, or procedure for determining a position of a mobile device as discussed herein, and/or as known in the art at the time of filing, and/or as developed after the time of filing.

In one embodiment, location data 101 is provided to one or more location monitoring systems, such as traffic/arrival time estimation system 160.

As noted above, in one embodiment, appointment tracking and dynamic modification system 127 of process for providing dynamic appointment scheduling and tracking 200 includes, and/or is linked to, and/or is associated with, one or more location monitoring systems, such as traffic/arrival time estimation system 160. In one embodiment, one or more location monitoring systems, such as traffic/arrival time estimation system 160, are part of appointment tracking and dynamic modification computing system 120.

In one embodiment, the one or more traffic analysis and/or arrival time estimators, such as traffic/arrival time estimation system 160, are provided calendar data 103 and appointment data 151 such as location and time data associated with a scheduled appointment, as well as location data 101 indicating the current location of the registered attending client/customer to the scheduled appointment associated with client/customer computing system 100. In one embodiment, the one or more traffic analysis and/or arrival time estimators, such as traffic/arrival time estimation system 160, then determine an estimated arrival time for the registered attending client/customer at the scheduled appointment place and generate traffic/arrival time data 161.

In various embodiments, the one or more traffic analysis and/or arrival time estimators, such as traffic/arrival time estimation system 160, determine the estimated arrival times for the registered attending client/customer and generate traffic/arrival time data 161 by determining the average commute time between the current location of the registered attending client/customer and the location of the scheduled appointment. In some embodiments, the average commute time and traffic/arrival time data 161 is determined for the scheduled time of the appointment, i.e., based on average traffic and/or other commute time data associated with the specific appointment time.

In various embodiments the one or more traffic analysis and/or arrival time estimators, such as traffic/arrival time estimation system 160, determine the estimated arrival times for the registered attending client/customer, and generate traffic/arrival time data 161, using relative real time data indicating the traffic, and/or actual delay times, between the current location of the registered attending client/customer and the location of the scheduled appointment. In these embodiments, the one or more traffic analysis and/or arrival time estimators, such as traffic/arrival time estimation system 160, are provided input (not shown in FIG. 1) from one or more real time traffic monitoring and commute time estimation systems, as discussed herein, and/or as known in the art/available at the time of filing, and/or as developed/made available after the time of filing.

In various embodiments, the one or more traffic analysis and/or arrival time estimators, such as traffic/arrival time estimation system 160, determine the estimated time of arrival of the registered attending client/customer, and generate traffic/arrival time data 161, by calculating a relative real time speed and direction associated with the mobile devices, and/or mobile computing systems, associated with the registered attending client/customer.

For instance, in one embodiment, location data 101 indicating the location of the registered attending client/customer to the scheduled appointment associated with client/customer computing system 100, is obtained at two or more times and then this data is used to calculate, and/or update, an estimated direction/path and speed of the registered attending client/customer.

In one embodiment, the data regarding the position of client/customer computing system 100 at two or more times is used to calculate, and/or update, an estimated direction/path and speed of the registered attending client/customer and then the estimated direction/path for the registered attending client/customer is modified based on other data particular to the registered attending client/customer such as data obtained from a calendar application indicating a time and place of any other appointments/appointments for the registered attending client/customer that must occur before the scheduled appointment.

Returning to FIG. 1, client/customer computing system 100 may further include standard user interface devices (not shown in FIG. 1) such as a keyboard, a mouse, a printer, and a display device, as well as, one or more standard input/output (I/O) devices, such as a compact disk (CD) or Digital Video Disc (DVD) drive, floppy disk drive, or other digital or waveform port, or other device capable of inputting data to, and outputting data from, client/customer computing system 100 whether available or known at the time of filing or as later developed. In one embodiment, process for providing dynamic appointment scheduling and tracking and/or a computing system implemented appointment scheduling system are entered, in whole, or in part, into client/customer computing system 100 via an I/O device, such as from a CD, DVD, floppy disk, portable hard drive, memory stick, download site, or other medium and/or computer program product as defined herein.

Client/customer computing system 100 can be any computing systems as defined herein and/or as known in the art at the time of filing and/or as developed thereafter, that includes components that can execute all, or part, of process for providing dynamic appointment scheduling and tracking 200 in accordance with at least one of the embodiments as described herein.

In one embodiment, client/customer computing system 100 is in operative communication with appointment tracking and dynamic modification computing system 120. In one embodiment, appointment tracking and dynamic modification computing system 120 includes; CPU 121 and appointment tracking and dynamic modification system 127.

In one embodiment, appointment tracking and dynamic modification system 127 is, or is associated with, one or more applications and/or data management systems implemented on one or more computing systems and/or one or more mobile computing systems accessible by one or more parties to a scheduled appointment, such as client/customer computing system 100.

In one embodiment, appointment tracking and dynamic modification system 127 is associated with one or more individual user calendar and/or appointment scheduling applications implemented on one or more user computing systems and receives calendar data 103 from client/customer computing system 100 via network/cloud 130.

As discussed below, in one embodiment, appointment tracking and dynamic modification system 127 is associated with one or more centralized appointment scheduling applications, such as centralized appointment scheduling system 150, used by/accessed by one or more users such as employees of a service/appointment-based business providing the centralized appointment scheduling applications, or any other users of a centralized appointment scheduling application, and thereby receives appointment data 151.

In one embodiment, appointment tracking and dynamic modification system 127 is part of a cloud-based architecture, and/or system, whereby appointment tracking and dynamic modification system 127 can be accessed by, and/or can access, multiple computing systems and/or mobile computing systems, such as client/customer computing system 100, multiple individual user calendar and/or appointment scheduling applications, and/or multiple centralized appointment scheduling applications, as discussed herein, and/or as known in the art/available at the time of filing, and/or as developed/made available after the time of filing.

In one embodiment, appointment tracking and dynamic modification system 127 includes, and/or is linked to, and/or is associated with, one or more location monitoring systems (not shown) as discussed herein, and/or as known in the art/available at the time of filing, and/or as developed/made available after the time of filing, through which appointment tracking and dynamic modification system 127 obtains location tracking data associated with one or more computing systems, and/or mobile computing systems, such as client/customer computing system 100, used by, under the control of, and/or otherwise associated with, one or more users.

In one embodiment, appointment tracking and dynamic modification system 127 includes, and/or is linked to, and/or is associated with, one or more traffic analysis and/or arrival time estimators, such as traffic/arrival time estimation system 160, and/or as discussed herein, and/or as known in the art/available at the time of filing, and/or as developed/made available after the time of filing. In one embodiment, appointment tracking and dynamic modification system 127 obtains traffic arrival time data 161 from traffic/arrival time estimation system 160 indicating an estimated time of arrival for one or more parties to a scheduled appointment.

In one embodiment, appointment tracking and dynamic modification system 127, includes, and/or is linked to, and/or is associated with, one or more systems, methods, and/or mechanisms, for determining the availability of a service provider at the time of the scheduled appointment, or at the estimated arrival time of the attending client/customer, and for generating service provider availability data 152. In one embodiment service provider availability data 152 is provided to appointment tracking and dynamic modification system 127 from centralized appointment scheduling system 150.

As one illustrative example, in one embodiment, service provider availability data 152 is determined implicitly based on tracking when other earlier appointments with the service provider end and/or when another earlier registered attending client/customer drives away from the service provider's location.

As another illustrative example, in one embodiment, service provider availability data 152 is determined implicitly based a trigger event such as an earlier client/customer going to a front desk/station to setup a follow-up appointment.

As another illustrative example, in one embodiment, service provider availability data 152 is determined explicitly via staff updates when a given earlier appointment begins or ends.

In one embodiment, appointment modification rules data, such as rules data 123, associated with the operation and/or application of appointment tracking and dynamic modification system 127 are obtained and/or defined and provided to appointment tracking and dynamic modification system 127. As discussed above, in various embodiments, rules data 123 represents instructions and guidelines that govern the operation and/or application of various actions to be initiated by appointment tracking and dynamic modification system 127.

In various embodiments, rules data 123 includes instructions and guidelines that govern the operation and/or application of various actions to be initiated by appointment tracking and dynamic modification system 127 that are provided by input from one or more clients/customers using, and or implementing, process for providing dynamic appointment scheduling and tracking 200.

In various embodiments, rules data 123 includes instructions and guidelines that govern the operation and/or application of various actions to be initiated by appointment tracking and dynamic modification system 127 that are provided by the service/appointment-based business using process for providing dynamic appointment scheduling and tracking 200, and/or the provider of process for providing dynamic appointment scheduling and tracking 200.

In one embodiment, process for providing dynamic appointment scheduling and tracking 200, and/or appointment tracking and dynamic modification system 127, is provided access to client/customer registration data 126.

In one embodiment, one or more clients/customers are registered to use, and/or take part in, process for providing dynamic appointment scheduling and tracking 200. In one embodiment, as part of the registration process, the parties are requested to provide client/customer registration data 126.

In various embodiments, client/customer registration data 126 provided by the parties registering with process for providing dynamic appointment scheduling and tracking 200 includes, but is not limited to, one or more of: contact information for the registering client/customer such as mobile phone numbers, e-mail addresses, and/or other text-based message contact information, traditional phone numbers, etc.; data indicating various preferences associated with the registering clients/customers such as, occupations and flexibility with regard to scheduling, the need or desire to meet with a specific service provider; the services to be provided at the scheduled appointments; permission to access one or more calendar systems and/or appointment scheduling systems associated with the registering client/customer; permission to track the location of the registering client/customer; and/or any other registration data desired, and/or required, by one or more parties using, and/or implementing, the process for providing dynamic appointment scheduling and tracking, as discussed herein, and/or as known in the art/available at the time of filing, and/or as developed/made available after the time of filing.

In various embodiments, appointment tracking and dynamic modification system 127 is provided wait list data 125 representing a waitlist of substitute clients/customers for vacated scheduled appointments.

In various embodiments, appointment tracking and dynamic modification system 127 generates action instructions data 129 whereby, if a determination is made that the registered attending client/customer, and/or service provider, is likely to be delayed, or unavailable, at the scheduled time of a scheduled appointment, one or more actions are taken to notify the other party, and/or to reschedule, or otherwise modify, the scheduled appointment in accordance with the appointment modification rules data of rules data 123 associated with the operation and/or application of process for providing dynamic appointment scheduling and tracking 200, and/or appointment data 151 from one or more appointment scheduling applications.

In various embodiments, appointment tracking and dynamic modification computing system 120 is used in a station-to-station arrangement, such as a peer-to-peer, or hybrid peer-to peer, arrangement, as an indexing and/or central server used to connect a first computing system, such as any of client/customer computing system 100, and a second computing system, such as any other computing system.

In one embodiment, all, or part, of process for providing dynamic appointment scheduling and tracking 200, and/or appointment scheduling system, is stored in appointment tracking and dynamic modification computing system 120, and is used by, or is accessed by, process for providing dynamic appointment scheduling and tracking 200. In one embodiment, appointment tracking and dynamic modification computing system 120 is accessible by one or more users, and/or a provider of an appointment scheduling system. In one embodiment, appointment tracking and dynamic modification computing system 120 is used, and/or accessible, by a computing system, such as client/customer computing system 100, and/or one or more databases.

Network/cloud 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as client/customer computing system 100, centralized calendar/appointment system 150, traffic/arrival time estimation system 160, appointment tracking and dynamic modification computing system 120, and their respective components, are shown for illustrative purposes only and that architectures with more or fewer components can implement, and benefit from, the invention. Moreover, one or more components of client/customer computing system 100, centralized calendar/appointment system 150, traffic/arrival time estimation system 160, appointment tracking and dynamic modification computing system 120, may be located remotely from their respective system and accessed via network/cloud 130. In addition, the particular type of, and configuration of, client/customer computing system 100, centralized calendar/appointment system 150, traffic/arrival time estimation system 160, appointment tracking and dynamic modification computing system 120, are not relevant.

As discussed in more detail below, in one embodiment, all, or part, of process for providing dynamic appointment scheduling and tracking 200, and/or a data management system, and/or a calendar system, and/or appointment scheduling system, is stored in any memory system and/or cache memory, of client/customer computing system 100, and/or centralized calendar/appointment system 150, and/or traffic/arrival time estimation system 160, and/or appointment tracking and dynamic modification computing system 120, and executed on another system. As used herein, a memory refers to a volatile memory, a non-volatile memory, or any combination of the two.

Although process for providing dynamic appointment scheduling and tracking 200, and/or a data management system, and/or a calendar system, and/or appointment scheduling system, are sometimes referred to herein, alternatively, as a process, an application, a module, a program, a component of a software system, a component of a software package, a component of a parent system, a plug-in, or a feature of a parent system, this terminology is illustrative only. In some embodiments, process for providing dynamic appointment scheduling and tracking 200, and/or a data management system, and/or a calendar system, and/or appointment scheduling system, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 121. In one embodiment, execution of a process by a CPU, results in the operations of an agent computer process (not shown) and/or a rule computer process (not shown).

In one embodiment, all, or part, of process for providing dynamic appointment scheduling and tracking 200, and/or a data management system, and/or a calendar system, and/or appointment scheduling system, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as appointment tracking and dynamic modification computing system 120 of FIG. 1, or other media or process capable of delivering computer readable data representing computer readable code, whether available or known at the time of filing or as later developed. This medium may belong to a computing system, such as any of the computing systems described above. However, in some embodiments, the medium also may be removable and/or remote from the computing system.

Process

In accordance with one embodiment, a system and method for providing dynamic appointment scheduling and tracking includes a process for providing dynamic appointment scheduling and tracking whereby an appointment tracking and dynamic modification system is provided. In one embodiment, the appointment tracking and dynamic modification system is associated with one or more appointment scheduling applications implemented on one or more computing systems, as used by one or more service providers.

In one embodiment, one or more clients/customers are registered to use, and/or take part in, the process for providing dynamic appointment scheduling and tracking.

In one embodiment, a client/customer registered with the process for providing dynamic appointment scheduling and tracking is assigned an appointment date and time through the one or more appointment scheduling applications associated with the process for providing dynamic appointment scheduling and tracking. In one embodiment, appointment data associated with the assigned appointment, including data indicating the location of the appointment, and the time of the appointment, is provided to the process for providing dynamic appointment scheduling and tracking, and/or the appointment tracking and dynamic modification system.

In one embodiment, the physical location and/or status of the registered attending client/customer is then monitored to calculate an estimated arrival time of the registered attending client/customer at the appointment location and to determine if the registered attending client/customer may be delayed with respect to the scheduled appointment.

In one embodiment, the physical location and/or status of the service provider associated with the scheduled appointment is also monitored to determine if the service provider will be available at the calculated estimated arrival time of the registered attending client/customer at the appointment location and to determine if the service provider may be delayed with respect to the scheduled appointment.

In one embodiment, if a determination is made that the registered attending client/customer is likely to be delayed, or unavailable, at the scheduled time of the appointment, or the service provider is likely to be delayed, or unavailable, at the scheduled time of the appointment, or the calculated arrival time of the registered attending client/customer, one or more actions are taken to notify the registered attending client/customer, and/or to reschedule, or otherwise modify, the scheduled appointment in accordance with appointment modification rules associated with the operation and/or application of the process for providing dynamic appointment scheduling and tracking, and/or the appointment data from one or more appointment scheduling applications, and/or the registered attending client/customer registration data.

Figure 2:
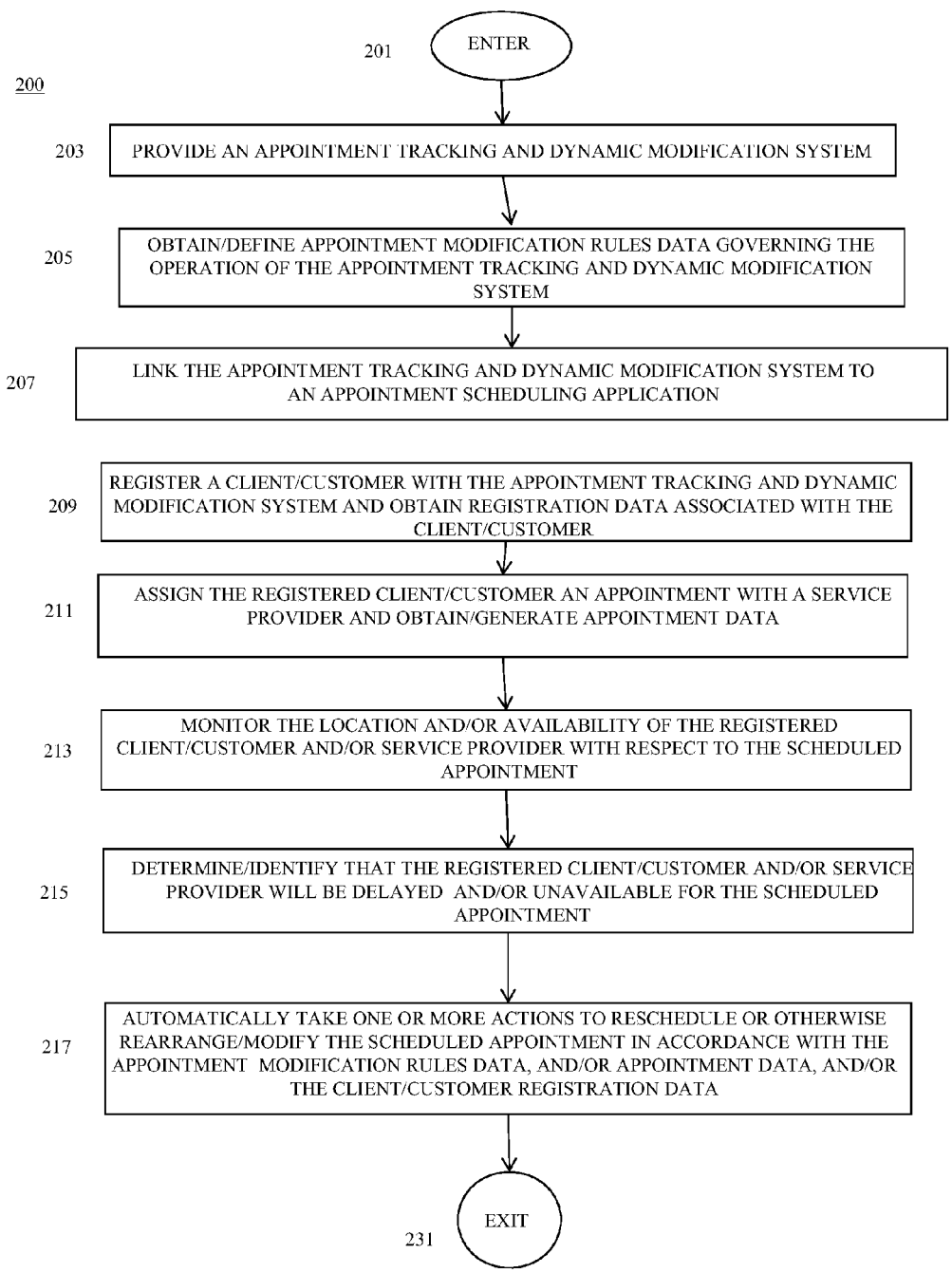
FIG. 2 is a flow chart depicting a process for providing dynamic appointment scheduling and tracking in accordance with one embodiment.

FIG. 2 a flow chart depicting a process for providing dynamic appointment scheduling and tracking 200 in accordance with one embodiment. In accordance with one embodiment, a system and method for providing dynamic appointment scheduling and tracking includes process for providing dynamic appointment scheduling and tracking 200.

In one embodiment, at least part of process for providing dynamic appointment scheduling and tracking 200 is implemented on one or more computing systems, and/or one or more mobile computing systems.

Herein the term "computing system" includes, but is not limited to, any computing system known in the art at the time of filing, and/or as developed after the time of filing, such as, but not limited to: a desktop computing system; a laptop computing system; a notebook computing system; a workstation; a two-way pager; a cellular telephone; a smart phone; a digital wireless telephone; a Personal Digital Assistant (PDA); a server computer; an Internet appliance, and/or any other device, or any desired combination of these devices, that includes components that can execute all, or part, of a process for providing dynamic appointment scheduling and tracking in accordance with at least one of the embodiments as discussed herein, and/or as known in the art at the time of filing, and/or as developed after the time of filing.

Herein, the term "mobile computing system" includes, but not limited to: a mobile phone; a smart phone; an internet appliance; any SMS capable system; or any other mobile computing system as discussed herein, and/or as known in the art at the time of filing, and/or as developed after the time of filing.

In one embodiment, at least part of process for providing dynamic appointment scheduling and tracking 200 is, or is associated with, one or more applications, and/or data management systems, implemented on one or more computing systems accessible by one or more parties.

Herein, the term "application" includes, but is not limited to, any computing system implemented, and/or online, systems, packages, programs, and/or modules, implemented in whole, or in part, by any computing system and/or website as discussed herein, and/or as known in the art/available at the time of filing, and/or as developed/made available after the time of filing. Specific examples of applications include, but are not limited to, calendar applications, appointment scheduling applications, mobile applications, social media applications, data management systems, operating systems, interface systems, and/or financial management systems.

Process for providing dynamic appointment scheduling and tracking 200 begins at ENTER OPERATION 201 of FIG. 2 and process flow proceeds to PROVIDE AN APPOINTMENT TRACKING AND DYNAMIC MODIFICATION SYSTEM OPERATION 203.

In one embodiment, at PROVIDE AN APPOINTMENT TRACKING AND DYNAMIC MODIFICATION SYSTEM OPERATION 203 an appointment tracking and dynamic modification system is provided.

In one embodiment, the appointment tracking and dynamic modification system provided at PROVIDE AN APPOINTMENT TRACKING AND DYNAMIC MODIFICATION SYSTEM OPERATION 203 is implemented, at least in part, on one or more appointment tracking and dynamic modification computing systems, such as appointment tracking and dynamic modification computing system 120 of FIG. 1, and/or one or more user computing systems, and/or one or more mobile computing systems, such as client/customer computing system 100 of FIG. 1.

Returning to FIG. 2, in one embodiment, the appointment tracking and dynamic modification system provided at PROVIDE AN APPOINTMENT TRACKING AND DYNAMIC MODIFICATION SYSTEM OPERATION 203 is, or is associated with, one or more applications and/or data management systems implemented on one or more appointment tracking and dynamic modification computing systems, and/or one or more mobile computing systems, accessible by one or more parties to a scheduled appointment.

In one embodiment, the appointment tracking and dynamic modification system of PROVIDE AN APPOINTMENT TRACKING AND DYNAMIC MODIFICATION SYSTEM OPERATION 203 is associated with one or more individual user calendar and/or appointment scheduling applications implemented on one or more user computing systems as discussed herein, and/or as known in the art/available at the time of filing, and/or as developed/made available after the time of filing.

In one embodiment, the appointment tracking and dynamic modification system of PROVIDE AN APPOINTMENT TRACKING AND DYNAMIC MODIFICATION SYSTEM OPERATION 203 is associated with one or more centralized appointment scheduling applications used by/accessed by one or more users such as employees of a service/appointment-based business implementing the centralized appointment scheduling applications, or any other users of a centralized appointment scheduling application as discussed herein, and/or as known in the art/available at the time of filing, and/or as developed/made available after the time of filing.

In one embodiment, the appointment tracking and dynamic modification system of PROVIDE AN APPOINTMENT TRACKING AND DYNAMIC MODIFICATION SYSTEM OPERATION 203 is part of a cloud-based architecture, and/or system, whereby the appointment tracking and dynamic modification system can be accessed by, and/or can access, multiple computing systems and/or mobile computing systems, multiple user calendar and/or appointment scheduling applications, and/or multiple centralized appointment scheduling applications, as discussed herein, and/or as known in the art/available at the time of filing, and/or as developed/made available after the time of filing.

As discussed below, in one embodiment, the appointment tracking and dynamic modification system of PROVIDE AN APPOINTMENT TRACKING AND DYNAMIC MODIFICATION SYSTEM OPERATION 203 includes, and/or is linked to, and/or is associated with, one or more location monitoring systems as discussed herein, and/or as known in the art/available at the time of filing, and/or as developed/made available after the time of filing, through which the appointment tracking and dynamic modification system obtains location tracking data associated with one or more computing systems, and/or mobile computing systems, used by, under the control of, and/or otherwise associated with, one or more users.

As discussed below, in one embodiment, the appointment tracking and dynamic modification system of PROVIDE AN APPOINTMENT TRACKING AND DYNAMIC MODIFICATION SYSTEM OPERATION 203 includes, and/or is linked to, and/or is associated with, one or more traffic analysis and/or arrival time estimators, as discussed herein, and/or as known in the art/available at the time of filing, and/or as developed/made available after the time of filing, whereby the appointment tracking and dynamic modification system obtains data indicating an estimated time of arrival the registered attending client/customer, and/or service provider, who are scheduled to be parties to a scheduled appointment.

As discussed below, in one embodiment, the appointment tracking and dynamic modification system of PROVIDE AN APPOINTMENT TRACKING AND DYNAMIC MODIFICATION SYSTEM OPERATION 203 includes, and/or is linked to, and/or is associated with, one or more calendar/appointment scheduling systems, as discussed herein, and/or as known in the art/available at the time of filing, and/or as developed/made available after the time of filing, whereby the appointment tracking and dynamic modification system obtains data indicating the estimated availability of a service provider at the time of the scheduled appointment and/or at the estimated time of arrival of the registered attending client/customer scheduled for an appointment.

In one embodiment, once an appointment tracking and dynamic modification system is provided at PROVIDE AN APPOINTMENT TRACKING AND DYNAMIC MODIFICATION SYSTEM OPERATION 203, process flow proceeds to OBTAIN/DEFINE APPOINTMENT MODIFICATION RULES DATA GOVERNING THE OPERATION OF THE APPOINTMENT TRACKING AND DYNAMIC MODIFICATION SYSTEM OPERATION 205.

In one embodiment, at OBTAIN/DEFINE APPOINTMENT MODIFICATION RULES DATA GOVERNING THE OPERATION OF THE APPOINTMENT TRACKING AND DYNAMIC MODIFICATION SYSTEM OPERATION 205 appointment modification rules data associated with the operation and/or application of the appointment tracking and dynamic modification system of PROVIDE AN APPOINTMENT TRACKING AND DYNAMIC MODIFICATION SYSTEM OPERATION 203 are obtained and/or defined.

In various embodiments, the appointment modification rules data of OBTAIN/DEFINE APPOINTMENT MODIFICATION RULES DATA GOVERNING THE OPERATION OF THE APPOINTMENT TRACKING AND DYNAMIC MODIFICATION SYSTEM OPERATION 205 represents instructions and guidelines that govern the operation and/or application of various actions to be initiated by the appointment tracking and dynamic modification system of PROVIDE AN APPOINTMENT TRACKING AND DYNAMIC MODIFICATION SYSTEM OPERATION 203.

In various embodiments, the appointment modification rules data of OBTAIN/DEFINE APPOINTMENT MODIFICATION RULES DATA GOVERNING THE OPERATION OF THE APPOINTMENT TRACKING AND DYNAMIC MODIFICATION SYSTEM OPERATION 205 includes instructions and guidelines that govern the operation and/or application of various actions to be initiated by the appointment tracking and dynamic modification system of PROVIDE AN APPOINTMENT TRACKING AND DYNAMIC MODIFICATION SYSTEM OPERATION 203 that are provided by input from one or more clients/customers using, and or implementing, process for providing dynamic appointment scheduling and tracking 200.

In various embodiments, the appointment modification rules data of OBTAIN/DEFINE APPOINTMENT MODIFICATION RULES DATA GOVERNING THE OPERATION OF THE APPOINTMENT TRACKING AND DYNAMIC MODIFICATION SYSTEM OPERATION 205 includes instructions and guidelines that govern the operation and/or application of various actions to be initiated by the appointment tracking and dynamic modification system of PROVIDE AN APPOINTMENT TRACKING AND DYNAMIC MODIFICATION SYSTEM OPERATION 203 that are provided by the service/appointment-based business using process for providing dynamic appointment scheduling and tracking 200, and/or the provider of process for providing dynamic appointment scheduling and tracking 200.

As a specific example, in one embodiment, the appointment modification rules data of OBTAIN/DEFINE APPOINTMENT MODIFICATION RULES DATA GOVERNING THE OPERATION OF THE APPOINTMENT TRACKING AND DYNAMIC MODIFICATION SYSTEM OPERATION 205 includes instructions and or guidelines including, but not limited to: data representing a waitlist of substitute clients/customers for vacated scheduled appointments; data indicating a threshold estimated delay time after which the scheduled appointment will be canceled/vacated, or will be filled by clients/customers on a waitlist; data designating one or more critical parties, such as a preferred or specific service provider, that must be present in order for an appointment to proceed; data indicating various service provider policies such as not canceling or rescheduling defined clients/customers, or sending any clients/customers away, or giving regular, or highly profitable, clients/customers priority; data indicating various service provider policies such as giving emergency situations higher priority and longer delay windows before the appointment is rescheduled; and/or any other parameters desired by one or more parties to a scheduled appointment and/or the provider of the appointment tracking and dynamic modification system.

In various other embodiments, appointment modification rules data of OBTAIN/DEFINE APPOINTMENT MODIFICATION RULES DATA GOVERNING THE OPERATION OF THE APPOINTMENT TRACKING AND DYNAMIC MODIFICATION SYSTEM OPERATION 205 can include data representing any instructions and or operating parameters for the appointment tracking and dynamic modification system of PROVIDE AN APPOINTMENT TRACKING AND DYNAMIC MODIFICATION SYSTEM OPERA- TION 203 desired, and/or required, by any of the parties using, and/or implementing, process for providing dynamic appointment scheduling and tracking 200.

In one embodiment, once appointment modification rules data associated with the operation and/or application of the appointment tracking and dynamic modification system of PROVIDE AN APPOINTMENT TRACKING AND DYNAMIC MODIFICATION SYSTEM OPERATION 203 are obtained and/or defined at OBTAIN/DEFINE APPOINTMENT MODIFICATION RULES DATA GOVERNING THE OPERATION OF THE APPOINTMENT TRACKING AND DYNAMIC MODIFICATION SYSTEM OPERATION 205, process flow proceeds to LINK THE APPOINTMENT TRACKING AND DYNAMIC MODIFICATION SYSTEM TO AN APPOINTMENT SCHEDULING APPLICATION OPERATION 207.

In one embodiment, at LINK THE APPOINTMENT TRACKING AND DYNAMIC MODIFICATION SYSTEM TO AN APPOINTMENT SCHEDULING APPLICATION OPERATION 207 process for providing dynamic appointment scheduling and tracking 200, and/or the appointment tracking and dynamic modification system of PROVIDE AN APPOINTMENT TRACKING AND DYNAMIC MODIFICATION SYSTEM OPERATION 203, is provided access to appointment data from one or more appointment scheduling applications, associated with one or more service/appointment-based businesses using, and/or implementing, process for providing dynamic appointment scheduling and tracking 200.

In one embodiment, at LINK THE APPOINTMENT TRACKING AND DYNAMIC MODIFICATION SYSTEM TO AN APPOINTMENT SCHEDULING APPLICATION OPERATION 207 process for providing dynamic appointment scheduling and tracking 200, and/or the appointment tracking and dynamic modification system of PROVIDE AN APPOINTMENT TRACKING AND DYNAMIC MODIFICATION SYSTEM OPERATION 203 is provided access to appointment data, such as appointment data 151 of FIG. 1, from the one or more centralized appointment scheduling system, such as centralized appointment scheduling system 150 of FIG. 1, that is a parent application for, or an application associated with, process for providing dynamic appointment scheduling and tracking 200, and/or the appointment tracking and dynamic modification system of PROVIDE AN APPOINTMENT TRACKING AND DYNAMIC MODIFICATION SYSTEM OPERATION 203.

Returning to FIG. 2, in various embodiments, the appointment data of LINK THE APPOINTMENT TRACKING AND DYNAMIC MODIFICATION SYSTEM TO AN APPOINTMENT SCHEDULING APPLICATION OPERATION 207 provided to, and/or accessed by, process for providing dynamic appointment scheduling and tracking 200, and/or the appointment tracking and dynamic modification system of PROVIDE AN APPOINTMENT TRACKING AND DYNAMIC MODIFICATION SYSTEM OPERATION 203, includes, but is not limited to, one or more of: data indicating the scheduled time for the appointment; data indicating the location of the scheduled appointment; data indicating the estimated length of time for the scheduled appointment; data indicating the service providers scheduled to attend the appointment; data indicating appointments scheduled before and/or after the scheduled appointment for the service provider scheduled to attend the appointment; data indicating any blocks of time available for the service providers scheduled to attend the appointment; and/or any other data associated with the scheduled appointment, and/or other scheduled appointments, made through the one or more appointment scheduling systems, associated with process for providing dynamic appointment scheduling and tracking 200 and/or the appointment tracking and dynamic modification system of PROVIDE AN APPOINTMENT TRACKING AND DYNAMIC MODIFICATION SYSTEM OPERATION 203, as discussed herein, and/or as known in the art/available at the time of filing, and/or as developed/made available after the time of filing.

In one embodiment, once process for providing dynamic appointment scheduling and tracking 200, and/or the appointment tracking and dynamic modification system of PROVIDE AN APPOINTMENT TRACKING AND DYNAMIC MODIFICATION SYSTEM OPERATION 203, is provided access to appointment data from one or more appointment scheduling applications at LINK THE APPOINTMENT TRACKING AND DYNAMIC MODIFICATION SYSTEM TO AN APPOINTMENT SCHEDULING APPLICATION OPERATION 207, process flow proceeds to REGISTER A CLIENT/CUSTOMER WITH THE APPOINTMENT TRACKING AND DYNAMIC MODIFICATION SYSTEM AND OBTAIN REGISTRATION DATA ASSOCIATED WITH THE CLIENT/CUSTOMER OPERATION 209.

In one embodiment, at REGISTER A CLIENT/CUSTOMER WITH THE APPOINTMENT TRACKING AND DYNAMIC MODIFICATION SYSTEM AND OBTAIN REGISTRATION DATA ASSOCIATED WITH THE CLIENT/CUSTOMER OPERATION 209 one or more clients/customers are registered to use, and/or take part in, process for providing dynamic appointment scheduling and tracking 200. In one embodiment, as part of the registration process, the clients/customers are requested to provide client/customer registration data, such as client/customer registration data 126 of FIG. 1.

Returning to FIG. 2, in various embodiments, the client/customer registration data includes, but is not limited to, one or more of: contact information for the client/customer such as mobile phone numbers, e-mail addresses, and/or other text-based message contact information, and/or traditional phone numbers, etc.; data indicating various preferences associated with the client/customer such as, occupation and flexibility with regard to scheduling, the need or desire to meet with a specific service provider, etc.; the service to be provided at the appointment; permission to access one or more calendar systems and/or appointment scheduling systems associated with the client/customer; permission to track the location of the client/customer; and/or any other registration data desired, and/or required, by one or more parties using, and/or implementing, the process for providing dynamic appointment scheduling and tracking, as discussed herein, and/or as known in the art/available at the time of filing, and/or as developed/made available after the time of filing.

In one embodiment, once one or more clients/customers are registered to use, and/or take part in, process for providing dynamic appointment scheduling and tracking 200, and provide client/customer registration data, at REGISTER A CLIENT/CUSTOMER WITH THE APPOINTMENT TRACKING AND DYNAMIC MODIFICATION SYSTEM AND OBTAIN REGISTRATION DATA ASSOCIATED WITH THE CLIENT/CUSTOMER OPERATION 209, process flow proceeds to ASSIGN THE ATTENDING CLIENT/CUSTOMER AN APPOINTMENT WITH A SERVICE PROVIDER AND OBTAIN/GENERATE APPOINTMENT DATA OPERATION 211.

In one embodiment, at ASSIGN THE ATTENDING CLIENT/CUSTOMER AN APPOINTMENT WITH A SERVICE PROVIDER AND OBTAIN/GENERATE APPOINT- MENT DATA OPERATION 211 an appointment is assigned to a client/customer of REGISTER A CLIENT/CUSTOMER WITH THE APPOINTMENT TRACKING AND DYNAMIC MODIFICATION SYSTEM AND OBTAIN REGISTRATION DATA ASSOCIATED WITH THE CLIENT/CUSTOMER OPERATION 209 using the one or more appointment scheduling applications of LINK THE APPOINTMENT TRACKING AND DYNAMIC MODIFICATION SYSTEM TO AN APPOINTMENT SCHEDULING APPLICATION OPERATION 207 and appointment data associated with the assigned appointment, such as appointment data 151 of FIG. 1, is provided to process for providing dynamic appointment scheduling and tracking 200, and/or the appointment tracking and dynamic modification system of PROVIDE AN APPOINTMENT TRACKING AND DYNAMIC MODIFICATION SYSTEM OPERATION 203.

Returning to FIG. 2, in one embodiment, at ASSIGN THE ATTENDING CLIENT/CUSTOMER AN APPOINTMENT WITH A SERVICE PROVIDER AND OBTAIN/GENERATE APPOINTMENT DATA OPERATION 211 process for providing dynamic appointment scheduling and tracking 200, and/or the appointment tracking and dynamic modification system of PROVIDE AN APPOINTMENT TRACKING AND DYNAMIC MODIFICATION SYSTEM OPERATION 203 is provided access to appointment data from one or more appointment scheduling applications, that is a parent application for, or an application associated with, process for providing dynamic appointment scheduling and tracking 200, and/or the appointment tracking and dynamic modification system.

In various embodiments, the appointment data of ASSIGN THE ATTENDING CLIENT/CUSTOMER AN APPOINTMENT WITH A SERVICE PROVIDER AND OBTAIN/GENERATE APPOINTMENT DATA OPERATION 211 provided to, and/or accessed by, process for providing dynamic appointment scheduling and tracking 200, and/or the appointment tracking and dynamic modification system of PROVIDE AN APPOINTMENT TRACKING AND DYNAMIC MODIFICATION SYSTEM OPERATION 203 includes, but is not limited to, one or more of: data indicating the scheduled time for the appointment; data indicating the location of the scheduled appointment; data indicating the estimated length of time for the scheduled appointment; data indicating the service providers scheduled to attend the appointment; data indicating appointments scheduled before and/or after the scheduled appointment for the service provider scheduled to attend the appointment; data indicating any blocks of time available for the service providers scheduled to attend the appointment; and/or any other data associated with the scheduled appointment, and/or other scheduled appointments, through the one or more appointment scheduling systems, associated with process for providing dynamic appointment scheduling and tracking 200 and/or the appointment tracking and dynamic modification system of PROVIDE AN APPOINTMENT TRACKING AND DYNAMIC MODIFICATION SYSTEM OPERATION 203, as discussed herein, and/or as known in the art/available at the time of filing, and/or as developed/made available after the time of filing.

In one embodiment, once an appointment is assigned to a client/customer of REGISTER A CLIENT/CUSTOMER WITH THE APPOINTMENT TRACKING AND DYNAMIC MODIFICATION SYSTEM AND OBTAIN REGISTRATION DATA ASSOCIATED WITH THE CLIENT/CUSTOMER OPERATION 209 using the one or more appointment scheduling applications of LINK THE APPOINTMENT TRACKING AND DYNAMIC MODIFICATION SYSTEM TO AN APPOINTMENT SCHEDULING APPLICATION OPERATION 207 and appointment data associated with the assigned appointment is provided at ASSIGN THE ATTENDING CLIENT/CUSTOMER AN APPOINTMENT WITH A SERVICE PROVIDER AND OBTAIN/GENERATE APPOINTMENT DATA OPERATION 211, process flow proceeds to MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213.

In one embodiment, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the location and/or status of the registered attending client/customer for the scheduled appointment of ASSIGN THE ATTENDING CLIENT/CUSTOMER AN APPOINTMENT WITH A SERVICE PROVIDER AND OBTAIN/GENERATE APPOINTMENT DATA OPERATION 211 is monitored.

In one embodiment, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the location and/or status of the registered attending client/customer, and/or service provider, for the scheduled appointment is monitored.

In one embodiment, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213, beginning at a defined monitoring commencement time prior to the time of the scheduled appointment of ASSIGN THE ATTENDING CLIENT/CUSTOMER AN APPOINTMENT WITH A SERVICE PROVIDER AND OBTAIN/GENERATE APPOINTMENT DATA OPERATION 211, the location and/or status of the registered attending client/customer, and/or the service provider, for the scheduled appointment is monitored.

In various embodiments, the monitoring commencement time of MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 is defined/established by the provider of process for providing dynamic appointment scheduling and tracking 200, and/or the appointment tracking and dynamic modification system of PROVIDE AN APPOINTMENT TRACKING AND DYNAMIC MODIFICATION SYSTEM OPERATION 203. In other embodiments, the monitoring commencement time is defined/established by the registered attending client/customer of REGISTER A CLIENT/CUSTOMER WITH THE APPOINTMENT TRACKING AND DYNAMIC MODIFICATION SYSTEM AND OBTAIN REGISTRATION DATA ASSOCIATED WITH THE CLIENT/CUSTOMER OPERATION 209.

In one embodiment, the location and/or status of the registered attending client/customer, and/or the service provider, is determined, at least in part, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 based on the positions of one or more computing systems, mobile devices, and/or mobile computing systems, associated with the registered attending client/customer, and/or the service provider, such as client/customer computing system 100 of FIG. 1.

Returning to FIG. 2, as noted above, in one embodiment, the appointment tracking and dynamic modification system of PROVIDE AN APPOINTMENT TRACKING AND DYNAMIC MODIFICATION SYSTEM OPERATION 203 includes, and/or is linked to, and/or is associated with, one or more location monitoring systems as discussed herein, and/or as known in the art/available at the time of filing, and/or as developed/made available after the time of filing.

In various embodiments, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213, through the one or more location monitoring systems, the positions of one or more mobile devices and/or mobile computing systems associated with the registered attending client/customer, and/or the service provider, are monitored/tracked based on analysis of a communication signal emitted by the mobile devices, and/or mobile computing systems, and/or the relay stations used by the mobile devices and/or mobile computing systems. In various embodiments, the position of the one or more mobile devices, and/or mobile computing systems, is determined using a Global Positioning Satellite (GPS) system and/or a GPS capability provided with the one or more mobile devices, and/or mobile computing systems. In various embodiments, the position of the one or more mobile devices, and/or mobile computing systems, is provided by the one or more mobile devices themselves via one or more data links. In various embodiments, the position of the one or more mobile devices, and/or mobile computing systems, is determined and/or provided by any method, means, mechanism, or procedure for determining a position of a mobile device as discussed herein, and/or as known in the art at the time of filing, and/or as developed after the time of filing.

In various embodiments, one or more of the one or more mobile devices, and/or computing systems, are associated with a registered attending client/customer, and/or the service provider, traveling by car, bicycle, train, bus, or any other vehicle in an relatively open environment, such as outside, or in a relatively closed environment, such as an office building mall, stadium, or shopping center. In various embodiments, one or more of the one or more mobile devices, and/or computing systems, are associated with a registered attending client/customer, and/or the service provider, traveling by foot in a relatively open environment, such as outside, or in a relatively closed environment, such as an office building, mall, stadium, or shopping center.

In various embodiments, the positions of one or more mobile devices, and/or mobile computing systems, associated with a registered attending client/customer, and/or the service provider, are monitored/tracked using the access data and permissions granted as part of the client/customer registration data provided by the registered attending client/customer.

In some embodiments, the location and/or status of the registered attending client/customer, and/or the service provider, is determined, at least in part, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 based on data provided directly from the registered attending client/customer, and/or the service provider, and/or from one or more calendar systems and/or appointment scheduling systems, associated with the registered attending client/customer, and/or the service provider.

In one embodiment, the location and/or status of the registered attending client/customer, and/or the service provider, is monitored at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 to determine if the registered attending client/customer, and/or the service provider, may be delayed with respect to the scheduled appointment.

As noted above, in one embodiment, the appointment tracking and dynamic modification system of PROVIDE AN APPOINTMENT TRACKING AND DYNAMIC MODIFICATION SYSTEM OPERATION 203 includes, and/or is linked to, and/or is associated with, one or more traffic analysis and/or arrival time estimators, as discussed herein, and/or as known in the art/available at the time of filing, and/or as developed/made available after the time of filing.

In one embodiment, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the one or more traffic analysis and/or arrival time estimators are provided the location data for the registered attending client/customer, and/or service provider, along with location data indicating the appointment location and appointment time data from ASSIGN THE ATTENDING CLIENT/CUSTOMER AN APPOINTMENT WITH A SERVICE PROVIDER AND OBTAIN/GENERATE APPOINTMENT DATA OPERATION 211. In one embodiment, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the one or more traffic analysis and/or arrival time estimators then determine an estimated arrival time for the registered attending client/customer, and/or service provider, at the scheduled appointment place.

In various embodiments, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the one or more traffic analysis and/or arrival time estimators determine the estimated arrival times for the registered attending client/customer, and/or service provider, by determining the average commute time between the current location of the registered attending client/customer, and/or service provider, and the location of the scheduled appointment. In some embodiments, the average commute time is determined for the scheduled time of the appointment, i.e., based on average traffic and/or other commute time data associated with the specific appointment time.

In various embodiments, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the one or more traffic analysis and/or arrival time estimators determine the estimated arrival times for the registered attending client/customer, and/or service provider, using relative real time data indicating the traffic, and/or actual delay times, between the current location of the registered attending client/customer, and/or service provider, and the location of the scheduled appointment. In these embodiments, the one or more traffic analysis and or arrival time estimators are provided input from one or more real time traffic monitoring and commute time estimation systems, as discussed herein, and/or as known in the art/available at the time of filing, and/or as developed/made available after the time of filing.

In various embodiments, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the one or more traffic analysis and or arrival time estimators determine the estimated time of arrival of the registered attending client/customer, and/or service provider, by calculating a relative real time speed and direction associated with the mobile devices, and/or mobile computing systems, associated with the registered attending client/customer, and/or service provider.

For instance, in one embodiment, the data regarding the position of the one or more mobile devices, and/or mobile computing systems, associated with the registered attending client/customer, and/or service provider, is obtained at two or more times and then this data is used to calculate, and/or update, an estimated direction/path and speed of the registered attending client/customer, and/or service provider.

In one embodiment, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the data regarding the position of the one or more mobile devices, and/or mobile computing systems, at two or more times is used to calculate, and/or update, an estimated direction/path and speed of the registered attending client/customer, and/or service provider, and then the estimated direction/path for the registered attending client/customer, and/or service provider, is modified based on other data particular to the registered attending client/customer, and/or service provider, such as data obtained from a calendar application, in one embodiment as implemented on the mobile device, indicating a time and place of any other appointments/appointments for the registered attending client/customer, and/or service provider, that must occur before the scheduled appointment.

Numerous means, methods, equations, algorithms, procedures and processes are known in the art for calculating an estimated direction/path and speed using two or more positions taken at different times. Consequently, a more detailed discussion of any particular means, methods, equations, algorithms, procedures and processes for calculating an estimated direction/path and speed of a registered attending client/customer, and/or service provider, using two or more positions taken at different times is omitted here to avoid detracting from the invention.

As noted above, in one embodiment, the appointment tracking and dynamic modification system of process for providing dynamic appointment scheduling and tracking 200, includes, and/or is linked to, and/or is associated with, one or more systems, methods, and/or mechanisms, for determining the availability of a service provider at the time of the scheduled appointment, or at the estimated arrival time of the attending client/customer.

As one illustrative example, in one embodiment, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the availability of a service provider is determined implicitly based on tracking when other earlier appointments with the service provider end and/or when another earlier registered attending client/customer drives away from the service provider's location.

As another illustrative example, in one embodiment, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the availability of a service provider is determined implicitly based a trigger event such as an earlier client/customer going to a front desk/station to setup a follow-up appointment.

As another illustrative example, in one embodiment, at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213 the availability of a service provider is determined explicitly via staff updates when a given earlier appointment begins or ends.

In on embodiment, once the location and/or status of the registered attending client/customer, and/or service provider, for the scheduled appointment is monitored at MONITOR THE LOCATION AND/OR AVAILABILITY OF THE REGISTERED ATTENDING CLIENT/CUSTOMER AND/OR SERVICE PROVIDER WITH RESPECT TO THE SCHEDULED APPOINTMENT OPERATION 213, process flow proceeds to DETERMINE/IDENTIFY THAT THE REGISTERED ATTENDING CLIENT/CUSTOMER AND/OR SERVICE PROVIDER WILL BE DELAYED AND/OR UNAVAILABLE FOR THE SCHEDULED APPOINTMENT OPERATION 215.

In one embodiment at DETERMINE/IDENTIFY THAT THE REGISTERED ATTENDING CLIENT/CUSTOMER AND/OR SERVICE PROVIDER WILL BE DELAYED AND/OR UNAVAILABLE FOR THE SCHEDULED APPOINTMENT OPERATION 215, a determination is made that the registered attending client/customer, and/or the service provider, of ASSIGN THE ATTENDING CLIENT/CUSTOMER AN APPOINTMENT WITH A SERVICE PROVIDER AND OBTAIN/GENERATE APPOINTMENT DATA OPERATION 211 is likely to be delayed, or unavailable, at the scheduled time of the appointment of ASSIGN THE ATTENDING CLIENT/CUSTOMER AN APPOINTMENT WITH A SERVICE PROVIDER AND OBTAIN/GENERATE APPOINTMENT DATA OPERATION 211.

In one embodiment once a determination is made that the registered attending client/customer, and/or the service provider, of ASSIGN THE ATTENDING CLIENT/CUSTOMER AN APPOINTMENT WITH A SERVICE PROVIDER AND OBTAIN/GENERATE APPOINTMENT DATA OPERATION 211 is likely to be delayed, or unavailable, at the scheduled time of the appointment of ASSIGN THE ATTENDING CLIENT/CUSTOMER AN APPOINTMENT WITH A SERVICE PROVIDER AND OBTAIN/GENERATE APPOINTMENT DATA OPERATION 211 at DETERMINE/IDENTIFY THAT THE REGISTERED ATTENDING CLIENT/CUSTOMER AND/OR SERVICE PROVIDER WILL BE DELAYED AND/OR UNAVAILABLE FOR THE SCHEDULED APPOINTMENT OPERATION 215, process flow proceeds to AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217.

In one embodiment, once a determination is made that the registered attending client/customer, and/or the service provider, is likely to be delayed, or unavailable, at the scheduled time of the appointment at DETERMINE/IDENTIFY THAT THE REGISTERED ATTENDING CLIENT/CUSTOMER AND/OR SERVICE PROVIDER WILL BE DELAYED AND/OR UNAVAILABLE FOR THE SCHEDULED APPOINTMENT OPERATION 215, then, at AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217, one or more actions are taken to notify the other party, i.e., the registered attending client/customer or the service provider, of ASSIGN THE ATTENDING CLIENT/CUSTOMER AN APPOINTMENT WITH A SERVICE PROVIDER AND OBTAIN/GENERATE APPOINTMENT DATA OPERATION 211, and/or to reschedule, or otherwise modify, the scheduled appointment of ASSIGN THE ATTENDING CLIENT/CUSTOMER AN APPOINTMENT WITH A SERVICE PROVIDER AND OBTAIN/GENERATE APPOINTMENT DATA OPERATION 211 in accordance with the appointment modification rules data associated with the operation and/or application of process for providing dynamic appointment scheduling and tracking of OBTAIN/DEFINE APPOINTMENT MODIFICATION RULES DATA GOVERNING THE OPERATION OF THE APPOINTMENT TRACKING AND DYNAMIC MODIFICATION SYSTEM OPERATION 205, and/or the appointment data from one or more appointment scheduling applications of LINK THE APPOINTMENT TRACKING AND DYNAMIC MODIFICATION SYSTEM TO AN APPOINTMENT SCHEDULING APPLICATION OPERATION 207, and/or the client/customer registration data provided by the parties registering with process for providing dynamic appointment scheduling and tracking 200 of REGISTER A CLIENT/CUSTOMER WITH THE APPOINTMENT TRACKING AND DYNAMIC MODIFICATION SYSTEM AND OBTAIN REGISTRATION DATA ASSOCIATED WITH THE CLIENT/CUSTOMER OPERATION 209. The delayed party, i.e., the registered attending client/customer, and/or service provider, is then notified of any change.

In one embodiment, once a determination is made that the registered attending client/customer, and/or service provider, is likely to be delayed, and/or unavailable, at the scheduled time of the appointment, the one or more actions taken at AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217 include, but are not limited to, analyzing the appointment modification rules data, and the appointment data from one or more appointment scheduling applications, to determine if the estimated delay can be absorbed. If the estimated delay time can be absorbed, then the appointment is automatically rescheduled for the estimated arrival/availability time of the delayed party and the delayed party is informed of the change.

In one embodiment, once a determination is made that the registered attending client/customer, and/or service provider, is likely to be delayed, and/or unavailable, at the scheduled time of the appointment, the one or more actions taken at AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217 include, but are not limited to, analyzing the appointment modification rules data, and the appointment data from one or more appointment scheduling applications, and determining if the delayed party can be substituted with a wait-listed client/customer or a stand-in service provider.

In one embodiment, once a determination is made that the registered attending client/customer, and/or service provider, is likely to be delayed, and/or unavailable, at the scheduled time of the appointment, the one or more actions taken at AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217 include process for providing dynamic appointment scheduling and tracking 200, and/or the appointment tracking and dynamic modification system, establishing text-based communication, such as e-mail, SMS, or IM communication, with the delayed party and providing the registered attending client/customer the capability to suggest, and/or to agree on, modifications to the scheduled appointment via the text-based communications.

In one embodiment, once a determination is made that the registered attending client/customer, and/or service provider, is likely to be delayed, and/or unavailable, at the scheduled time of the appointment, the one or more actions taken at AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217 include process for providing dynamic appointment scheduling and tracking 200, and/or the appointment tracking and dynamic modification system, establishing voice based communication, such as a phone call or conference call, with the delayed party and providing the registered attending client/customer the capability to suggest, and/or to agree on, modifications to the scheduled appointment via the voice communications.

In one embodiment, the voice communication between the registered attending client/customer is monitored by process for providing dynamic appointment scheduling and tracking 200, and/or the appointment tracking and dynamic modification system, and the agreement of the registered attending client/customer modifying the scheduled appointment is obtained, and/or implemented, by process for providing dynamic appointment scheduling and tracking 200, and/or the appointment tracking and dynamic modification system.

In one embodiment, once a determination is made that the registered attending client/customer, and/or service provider, is likely to be delayed, and/or unavailable, at the scheduled time of the appointment, the one or more actions taken at AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217 include process for providing dynamic appointment scheduling and tracking 200, and/or the appointment tracking and dynamic modification system, establishing chat based communication and/or social media based communication, such Yammer™, Facebook™, Yahoo™, Messenger™ Skype™, Twitter™ etc., with the parties to the scheduled appointment, and providing the registered attending client/customer the capability to suggest, and/or to agree on, modifications to the scheduled appointment via the chat based communication and/or social media based communication. In one embodiment, the communication between the registered attending client/customer is monitored by process for providing dynamic appointment scheduling and tracking 200, and/or the appointment tracking and dynamic modification system, and the agreement of the registered attending client/customer modifying the scheduled appointment is obtained, and/or implemented, by process for providing dynamic appointment scheduling and tracking 200, and/or the appointment tracking and dynamic modification system.

In one embodiment, once a determination is made that the registered attending client/customer, and/or the service provider, is likely to be delayed, and/or unavailable, at the scheduled time of the appointment, the one or more actions taken at AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217 include, notifying the other party, and any combination of the above actions, or other actions, consistent with the appointment modification rules data associated with the operation and/or application of process for providing dynamic appointment scheduling and tracking 200, and/or the appointment tracking and dynamic modification system, and/or the appointment data from one or more appointment scheduling applications, and/or the user registration data provided to process for providing dynamic appointment scheduling and tracking 200, as discussed herein, and/or as known in the art/available at the time of filing, and/or as developed/made available after the time of filing.

In one embodiment, once a determination is made that the registered attending client/customer, and/or the service provider, is likely to be delayed, and/or unavailable, at the scheduled time of the appointment, the one or more actions taken at AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217 include, but are not limited to, any actions defined and/or desired by the registered attending client/customer, and/or the service provider, and/or the provider of process for providing dynamic appointment scheduling and tracking 200, as discussed herein, and/or as known in the art/available at the time of filing, and/or as developed/made available after the time of filing.

In one embodiment, once one or more actions are taken to notify the registered attending client/customer, and/or the service provider, and/or to reschedule, or otherwise modify, the scheduled appointment in accordance with the appointment modification rules data associated with the operation and/or application of process for providing dynamic appointment scheduling and tracking 200, and/or the appointment data from one or more appointment scheduling applications, and/or the client/customer registration data, at AUTOMATICALLY TAKE ONE OR MORE ACTIONS TO RESCHEDULE OR OTHERWISE REARRANGE/MODIFY THE SCHEDULED APPOINTMENT IN ACCORDANCE WITH THE APPOINTMENT MODIFICATION RULES DATA, AND/OR APPOINTMENT DATA, AND/OR THE CLIENT/CUSTOMER REGISTRATION DATA OPERATION 217, process flow proceeds to EXIT OPERATION 231.

In one embodiment, at EXIT OPERATION 231, process for providing dynamic appointment scheduling and tracking 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing dynamic appointment scheduling and tracking 200, the physical location and/or status of the registered attending client/customer, and/or the availability of a service provider, associated with a scheduled appointment is monitored and if the either the registered attending client/customer, or the service provider, may be delayed with respect to the scheduled appointment, the registered attending client/customer, or the service provider, are automatically notified as early as possible so that the other party is running late. In addition, one or more actions to mitigate the effect of the delayed appointment on either party, are automatically taken based on predefined appointment modification rules.

Consequently, process for providing dynamic appointment scheduling and tracking 200 provides an effective system for identifying potentially delayed parties to an appointment, providing timely notification to the other party to the appointment of the delayed party, and/or the delayed party's estimated arrival time/availability, and providing solutions to the situation, so that inefficiencies, stress, lost productivity, and wasted time is minimized. As a result, using process for providing dynamic appointment scheduling and tracking 200, the benefits of appointment scheduling applications can be realized even in the face of the realities of modern life.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "calculating", "capturing", "categorizing", "classifying", "comparing", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing dynamic appointment scheduling and tracking comprising:
   using one or more processors to obtain access to one or more appointment scheduling systems;
   using one or more processors to obtain appointment data associated with an appointment scheduled through one or more of the one or more appointment scheduling systems, the appointment data indicating a location and time of a scheduled appointment, the registered attending client/customer assigned to attend the scheduled appointment, and the service provider assigned to attend the scheduled appointment;
   using one or more processors to monitor the location of the registered attending client/customer, and/or the service provider, assigned to attend the scheduled appointment and periodically obtaining location data associated with the registered attending client/customer, and/or the service provider, assigned to attend the scheduled appointment, indicating the location of the registered attending client/customer, and/or the service provider, assigned to attend the scheduled appointment;
   using one or more processors to analyze the location data associated with the registered attending client/customer, and/or the service provider, assigned to attend the scheduled appointment and the appointment data indicating the location and time of the scheduled appointment to determine if the registered attending client/customer, and/or the service provider, assigned to attend the scheduled appointment is likely to be late and/or unavailable for the scheduled appointment;
   if a determination is made that the registered attending client/customer, and/or the service provider, assigned to attend the scheduled appointment is likely to be late and/or unavailable for the scheduled appointment, using one or more processors to automatically inform the registered attending client/customer, and/or the service provider, assigned to attend the scheduled appointment of the delayed party;
   determining, using one or more processors, an estimated delay time of the delayed party;

determining, using one or more processors, whether the scheduled appointment is associated with an emergency;

assigning, using one or more processors, either a first allowed delay time or a second allowed delay time to the scheduled appointment based on the determination of whether the scheduled appointment is associated with an emergency, the first allowed delay time being a delay time associated with scheduled appointments that are not associated with emergencies, the second allowed delay time being longer than the first delay time, the second allowed delay time being associated with appointments that are associated with emergencies;

determining, using one or more processors, whether the estimated delay time of the party exceeds an allowed delay time associated with the scheduled appointment; and rescheduling or canceling, using one or more processors, the scheduled appointment based on the determination of whether the estimated delay time of the party exceeds the allowed delay time associated with the scheduled appointment.

2. The computing system implemented process for providing dynamic appointment scheduling and tracking of claim 1, wherein;

appointment data associated with the scheduled appointment further includes appointment data selected from the group of data consisting of:

data indicating the estimated length of time for the scheduled appointment;

data indicating any appointments scheduled before and/or after the scheduled appointment for either of the registered attending client/customer or the service provider assigned the scheduled appointment; and data indicating any blocks of time available for the registered attending client/customer, and/or the service provider, assigned the scheduled appointment.

3. The computing system implemented process for providing dynamic appointment scheduling and tracking of claim 1, wherein;

the monitoring of the location of the registered attending client/customer, and/or the service provider, assigned the scheduled appointment begins at a defined monitoring commencement time prior to the time of the scheduled appointment.

4. The computing system implemented process for providing dynamic appointment scheduling and tracking of claim 1, wherein;

at least part of the location data associated with the registered attending client/customer, and/or the service provider, assigned the scheduled appointment indicating the location of the registered attending client/customer, and/or the service provider, assigned the scheduled appointment is obtained from at least one mobile computing system associated with the registered attending client/customer, and/or the service provider, assigned the scheduled appointment.

5. The computing system implemented process for providing dynamic appointment scheduling and tracking of claim 1, wherein;

the location data associated the registered attending client/customer, and/or the service provider, assigned the scheduled appointment indicating the location of the registered attending client/customer, and/or the service provider, assigned the scheduled appointment is obtained from one or more sources of location data selected from the group of sources of location data consisting of:

a communication signal emitted by one or more mobile computing systems associated with the registered attending client/customer, and/or the service provider, assigned the scheduled appointment;

a communication signal emitted by relay stations used by one or more mobile computing systems associated with the registered attending client/customer, and/or the service provider, assigned the scheduled appointment;

a Global Positioning Satellite (GPS) system and/or a GPS capability provided by one or more mobile computing systems associated with the registered attending client/customer, and/or the service provider, assigned the scheduled appointment; and one or more data links from one or more mobile computing systems associated with the registered attending client/customer, and/or the service provider, assigned the scheduled appointment.

6. The computing system implemented process for providing dynamic appointment scheduling and tracking of claim 1, wherein;

the determination as to whether the registered attending client/customer, and/or the service provider, assigned the scheduled appointment is likely to be late and/or unavailable for the scheduled appointment is made based on analysis of the location data associated with the registered attending client/customer, and/or the service provider, assigned the scheduled appointment and the appointment data indicating the location and time of the scheduled appointment and data indicating average commute times from the location associated with the registered attending client/customer, and/or the service provider, assigned the scheduled appointment and the location and time of the scheduled appointment.

7. The computing system implemented process for providing dynamic appointment scheduling and tracking of claim 1, wherein;

the determination as to whether the registered attending client/customer, and/or the service provider, assigned the scheduled appointment is likely to be late and/or unavailable for the scheduled appointment is made based on analysis of the location data associated with the registered attending client/customer, and/or the service provider, assigned the scheduled appointment and the appointment data indicating the location and time of the scheduled appointment and data indicating relative real-time commute times from the location associated with the registered attending client/customer, and/or the service provider, assigned the scheduled appointment and the location and time of the scheduled appointment.

8. The computing system implemented process for providing dynamic appointment scheduling and tracking of claim 1, wherein;

the non-delayed party of the registered attending client/customer, or the service provider, assigned the scheduled appointment is automatically informed of the delayed party's delay and the estimated delay time.

9. The computing system implemented process for providing dynamic appointment scheduling and tracking of claim 1, wherein;

the non-delayed party of the registered attending client/customer, or the service provider, assigned the scheduled appointment is automatically informed of the delayed party's delay via one or more computing systems.

39

10. The computing system implemented process for providing dynamic appointment scheduling and tracking of claim 1, wherein;
the non-delayed party of the registered attending client/customer, or the service provider, assigned the scheduled appointment is automatically informed of the delayed party's delay via one or more mobile computing systems.

11. The computing system implemented process for providing dynamic appointment scheduling and tracking of claim 1, wherein;
the one or more actions to be automatically taken to modify the scheduled appointment in accordance with one or more appointment modification rules governing the application of the process for providing dynamic appointment scheduling and tracking includes:
estimating a delay time for the delayed party;
analyzing the appointment modification rules, and the appointment data, to determine if the estimated delay time for the delayed party can be absorbed; and
if the estimated delay time for the delayed party can be absorbed, then automatically rescheduling the scheduled appointment for the estimated arrival/availability time of the delayed party; and
informing the delayed party.

12. A system for providing dynamic appointment scheduling and tracking comprising:
at least one client/customer computing system associated with a registered attending client/customer assigned to attend a scheduled appointment;
one or more appointment scheduling systems; and
one or more processors associated with one or more computing systems, the one or more processors associated with one or more computing systems executing at least part of a process for providing dynamic appointment scheduling and tracking, the process for providing dynamic appointment scheduling and tracking including:
using the one or more processors associated with one or more computing systems to obtain access to the one or more appointment scheduling systems;
using the one or more processors associated with one or more computing systems to obtain appointment data associated with an appointment scheduled through one or more of the one or more appointment scheduling systems, the appointment data indicating a location and time of a scheduled appointment, the registered attending client/customer assigned to attend the scheduled appointment, and the service provider assigned to attend the scheduled appointment;
using the one or more processors associated with one or more computing systems to monitor the location of the registered attending client/customer, and/or the service provider, assigned to attend the scheduled appointment and periodically obtaining location data associated with the registered attending client/customer, and/or the service provider, assigned to attend the scheduled appointment, indicating the location of the registered attending client/customer, and/or the service provider, assigned to attend the scheduled appointment;
using the one or more processors associated with one or more computing systems to analyze the location data associated with the registered attending client/customer, and/or the service provider, assigned to attend the scheduled appointment and the appointment data indicating the location and time of the scheduled appointment to determine if the registered attending client/customer,

40 and/or the service provider, assigned to attend the scheduled appointment is likely to be late and/or unavailable for the scheduled appointment;
if a determination is made that the registered attending client/customer, and/or the service provider, assigned to attend the scheduled appointment is likely to be late and/or unavailable for the scheduled appointment, using the one or more processors associated with one or more computing systems to automatically inform the registered attending client/customer, and/or the service provider, assigned to attend the scheduled appointment of the delayed party;
determining, using one or more processors, an estimated delay time of the delayed party;
determining, using one or more processors, whether the scheduled appointment is associated with an emergency;
assigning, using one or more processors, either a first allowed delay time or a second allowed delay time to the scheduled appointment based on the determination of whether the scheduled appointment is associated with an emergency, the first allowed delay time being a delay time associated with scheduled appointments that are not associated with emergencies, the second allowed delay time being longer than the first delay time, the second allowed delay time being associated with appointments that are associated with emergencies;
determining, using one or more processors, whether the estimated delay time of the party exceeds an allowed delay time associated with the scheduled appointment; and
rescheduling or canceling, using one or more processors, the scheduled appointment based on the determination of whether the estimated delay time of the party exceeds the allowed delay time associated with the scheduled appointment.

13. The system for providing dynamic appointment scheduling and tracking of claim 12, wherein;
appointment data associated with the scheduled appointment further includes appointment data selected from the group of data consisting of:
data indicating the estimated length of time for the scheduled appointment;
data indicating any appointments scheduled before and/or after the scheduled appointment for either of the registered attending client/customer or the service provider assigned the scheduled appointment; and
data indicating any blocks of time available for the registered attending client/customer, and/or the service provider, assigned the scheduled appointment.

14. The system for providing dynamic appointment scheduling and tracking of claim 12, wherein;
the monitoring of the location of the registered attending client/customer, and/or the service provider, assigned the scheduled appointment begins at a defined monitoring commencement time prior to the time of the scheduled appointment.

15. The system for providing dynamic appointment scheduling and tracking of claim 12, wherein;
at least part of the location data associated with the registered attending client/customer, and/or the service provider, assigned the scheduled appointment indicating the location of the registered attending client/customer, and/or the service provider, assigned the scheduled appointment is obtained from at least one mobile computing system associated with the registered attending client/customer, and/or the service provider, assigned the scheduled appointment.

16. The system for providing dynamic appointment scheduling and tracking of claim 12, wherein;

the location data associated the registered attending client/customer, and/or the service provider, assigned the scheduled appointment indicating the location of the registered attending client/customer, and/or the service provider, assigned the scheduled appointment is obtained from one or more sources of location data selected from the group of sources of location data consisting of:

a communication signal emitted by one or more mobile computing systems associated with the registered attending client/customer, and/or the service provider, assigned the scheduled appointment;

a communication signal emitted by relay stations used by one or more mobile computing systems associated with the registered attending client/customer, and/or the service provider, assigned the scheduled appointment;

a Global Positioning Satellite (GPS) system and/or a GPS capability provided by one or more mobile computing systems associated with the registered attending client/customer, and/or the service provider, assigned the scheduled appointment; and one or more data links from one or more mobile computing systems associated with the registered attending client/customer, and/or the service provider, assigned the scheduled appointment.

17. The system for providing dynamic appointment scheduling and tracking of claim 12, wherein;

the determination as to whether the registered attending client/customer, and/or the service provider, assigned the scheduled appointment is likely to be late and/or unavailable for the scheduled appointment is made based on analysis of the location data associated with the registered attending client/customer, and/or the service provider, assigned the scheduled appointment and the appointment data indicating the location and time of the scheduled appointment and data indicating average commute times from the location associated with the registered attending client/customer, and/or the service provider, assigned the scheduled appointment and the location and time of the scheduled appointment.

18. The system for providing dynamic appointment scheduling and tracking of claim 12, wherein;

the determination as to whether the registered attending client/customer, and/or the service provider, assigned the scheduled appointment is likely to be late and/or unavailable for the scheduled appointment is made based on analysis of the location data associated with the registered attending client/customer, and/or the service provider, assigned the scheduled appointment and the appointment data indicating the location and time of the scheduled appointment and data indicating relative real-time commute times from the location associated with the registered attending client/customer, and/or the service provider, assigned the scheduled appointment and the location and time of the scheduled appointment.

19. The system for providing dynamic appointment scheduling and tracking of claim 12, wherein;

the non-delayed party of the registered attending client/customer, or the service provider, assigned the scheduled appointment is automatically informed of the delayed party's delay and the estimated delay time.

20. The system for providing dynamic appointment scheduling and tracking of claim 12, wherein;

the non-delayed party of the registered attending client/customer, or the service provider, assigned the scheduled appointment is automatically informed of the delayed party's delay via one or more computing systems.

21. The system for providing dynamic appointment scheduling and tracking of claim 12, wherein;

the non-delayed party of the registered attending client/customer, or the service provider, assigned the scheduled appointment is automatically informed of the delayed party's delay via one or more mobile computing systems.

22. The system for providing dynamic appointment scheduling and tracking of claim 12, wherein;

the one or more actions to be automatically taken to modify the scheduled appointment in accordance with one or more appointment modification rules governing the application of the process for providing dynamic appointment scheduling and tracking includes:

estimating a delay time for the delayed party;

analyzing the appointment modification rules, and the appointment data, to determine if the estimated delay time for the delayed party can be absorbed; and if the estimated delay time for the delayed party can be absorbed, then automatically rescheduling the scheduled appointment for the estimated arrival/availability time of the delayed party; and informing the delayed party.

* * * * *

UNITED STATES PATENT AND TRADEMARK OFFICE
CERTIFICATE OF CORRECTION

PATENT NO. : 8,849,689 B1  
APPLICATION NO. : 13/356102  
DATED : September 30, 2014  
INVENTOR(S) : Sridhar Jagannathan et al.

Page 1 of 1

It is certified that error appears in the above-identified patent and that said Letters Patent is hereby corrected as shown below:

In the Claims

In Column 37, Line 63, Claim 5, between "associated" and "the", insert --with--;
In Column 39, Line 20, Claim 11, after "absorbed;" delete "and";
In Column 41, Line 6, Claim 16, between "associated" and "the", insert --with--; and
In Column 42, Lines 41, Claim 22, after "absorbed;", delete "and".

Signed and Sealed this
Twenty-fourth Day of February, 2015

Michelle K. Lee
*Deputy Director of the United States Patent and Trademark Office*